(12) United States Patent
Benz et al.

(10) Patent No.: US 10,973,720 B2
(45) Date of Patent: Apr. 13, 2021

(54) IMAGE BASED MONITORING OF THE STATE OF A DEVICE

(71) Applicant: Hill-Rom Services, Inc., Batesville, IN (US)

(72) Inventors: Eric D. Benz, Sunman, IN (US); John D. Christie, Batesville, IN (US); Michael M. Frondorf, Lakeside Park, KY (US); Gavin M. Monson, Oxford, OH (US); Douglas A. Seim, Okeana, OH (US); Arpit S. Shah, Batesville, IN (US); Dan R. Tallent, Hope, IN (US); James D. Voll, Columbus, IN (US)

(73) Assignee: Hill-Rom Services, Inc., Batesville, IN (US)

( * ) Notice: Subject to any disclaimer, the term of this patent is extended or adjusted under 35 U.S.C. 154(b) by 758 days.

(21) Appl. No.: 15/668,226

(22) Filed: Aug. 3, 2017

(65) Prior Publication Data
US 2018/0289572 A1 Oct. 11, 2018

Related U.S. Application Data

(60) Provisional application No. 62/482,961, filed on Apr. 7, 2017.

(51) Int. Cl.
*A61G 7/10* (2006.01)
*G06K 9/00* (2006.01)
(Continued)

(52) U.S. Cl.
CPC .......... *A61G 7/1065* (2013.01); *A61G 7/002* (2013.01); *A61G 7/018* (2013.01); *A61G 7/1073* (2013.01); *A61G 12/00* (2013.01); *G06K 9/00771* (2013.01)

(58) Field of Classification Search
None
See application file for complete search history.

(56) References Cited

U.S. PATENT DOCUMENTS

| 7,813,941 B2 | 10/2010 | Auker et al. |
| 7,987,069 B2 | 7/2011 | Rodgers et al. |

(Continued)

FOREIGN PATENT DOCUMENTS

| CN | 102592063 A | 7/2014 |
| CN | 103908285 A | 7/2014 |

(Continued)

OTHER PUBLICATIONS

Wenjun Zeng, Microsoft Kinnect Sensor and Its Effect; Multimedia at Work, University of Missouri; Zhengyou Zhang; Microsoft Research; Published by the IEEE Computer Society; 1070-986X/12 $31.00 © 2012 IEEE; Apr.-Jun. 2012.

(Continued)

*Primary Examiner* — Anand P Bhatnagar
(74) *Attorney, Agent, or Firm* — Barnes & Thornburg LLP

(57) ABSTRACT

A method of determining information about a device includes the steps of 1) acquiring an image of at least a portion of the device, 2) comparing the information content of the image to the information content of at least one record of a library, and, 3) if the comparison is positive, reporting that the device is in the possible state represented by the library record. A method which depends on calculations based on the acquired image rather than on comparison of the information content of the image to the information content of one or more library records is also disclosed. A system for determining the state of the device is also disclosed.

20 Claims, 24 Drawing Sheets

(51) Int. Cl.
  *A61G 12/00* (2006.01)
  *A61G 7/018* (2006.01)
  *A61G 7/002* (2006.01)

(56) References Cited

U.S. PATENT DOCUMENTS

| | | | |
|---|---|---|---|
| 8,907,287 B2 | 12/2014 | Vanderpohl | |
| 9,204,823 B2 | 12/2015 | Derenne et al. | |
| 9,301,689 B2 | 4/2016 | Vanderpohl | |
| 9,311,804 B2 | 4/2016 | Ribble | |
| 9,552,714 B2 | 1/2017 | Ribble et al. | |
| 9,962,139 B2* | 5/2018 | Kojima | A61B 6/0457 |
| 10,037,821 B2* | 7/2018 | Johnson | G06Q 50/24 |
| 10,121,070 B2* | 11/2018 | Derenne | A61B 5/002 |
| 10,517,784 B2* | 12/2019 | Zerhusen | A61G 7/05 |
| 2006/0049936 A1* | 3/2006 | Collins, Jr. | A61B 5/1115 340/539.11 |
| 2008/0027754 A1* | 1/2008 | Auker | G06Q 50/22 705/2 |
| 2009/0275808 A1* | 11/2009 | DiMaio | A61B 5/704 600/301 |
| 2010/0212087 A1 | 8/2010 | Leib et al. | |
| 2012/0223821 A1* | 9/2012 | Collins, Jr. | A61B 5/1115 340/286.07 |
| 2013/0129047 A1* | 5/2013 | Lim | A61B 6/04 378/62 |
| 2015/0281659 A1* | 10/2015 | Hood | A61G 7/018 348/143 |

FOREIGN PATENT DOCUMENTS

| | | |
|---|---|---|
| DE | 102015000616 A1 | 7/2016 |
| WO | 2013025395 A2 | 2/2013 |
| WO | 20160663484 A1 | 4/2016 |

OTHER PUBLICATIONS

Axxon Next Video and Audio Detection Tools; Video and Audio Detection Tools; Mar. 5, 2017.
Technique to detect a hospital bed by camera—Open CV Q&A Forum; Mar. 9, 2017.

* cited by examiner

MANUFACTURER A

MANUFACTURER B

MANUFACTURER A

IMAGE BASED MONITORING OF THE STATE OF A DEVICE

TECHNICAL FIELD

The subject matter described herein relates to the use of imaging to monitor parameters, which are traditionally monitored by other means, in order to determine the state, status, or condition of a device. One example application for the described method and apparatus is the monitoring of status parameters of a hospital bed.

BACKGROUND

Hospitals and other health care facilities customarily employ a data communications system to report parameters of the beds in the facility to various destinations, many of which destinations are not in the immediate vicinity of the bed. In a typical arrangement, sensors installed on the beds detect parameters which indicate the state, status or condition of the bed or of one of its components. Electrical signals representative of the sensed parameters are conveyed to the communications network by way of a network interface unit and then across the network to their destinations. One example destination is a nurses' station where the information content of the signals is presented in human understandable form, such as text or graphics, on a video screen. Another example destination is a database where the information content of the signals is stored for future use.

The network interface unit acts as an intermediary between the bed and the communications network. The network interface unit is adapted to be compatible with and to facilitate data communication between beds produced by a particular bed manufacturer B and a communications network whose components are provided by a network supplier N. The bed manufacturer and the network supplier may be the same entity or may be different entities. However either way, the network interface unit is specific to a given bed manufacturer and a given network supplier. As a result the interface unit is unable to support communications between network N1 provided by network supplier N1 and beds B2 obtained from a bed manufacturer B2 or between the beds from bed manufacturer B1 and an information network provided by a different network supplier N2. (Symbol B is used to designate both beds and the manufacturer of those beds; N is similarly used to designate both networks and the supplier of those networks; different numerical suffixes to B and N indicate different bed manufacturers or network suppliers).

In principle, the above described bed/network incompatibility can be overcome by designing and deploying an interface unit compatible with the desired bed/network combination (B1/N2 or B2/N1). Alternatively, the management staff of a hospital with beds made by different manufacturers can invest in multiple network infrastructures, each of which is able to successfully communicate with only a subset of the beds in the facility. However in practice these can be costly endeavors, in part because of the proprietary nature of the technology employed by the bed manufacturer and network supplier.

A related difficulty is that even if all the beds in a hospital are made by the same manufacturer, some of those beds may have little or no capability to produce signals indicative of bed state, status, or condition.

Yet another related difficulty is that even if all the beds in a hospital are made by the same manufacturer, and even if those beds are capable of producing signals indicative of bed state, status or condition, a bed that becomes disconnected from its electrical power supply will not be able to produce the signals or will be able to do so for only a limited time if the bed is equipped with a backup battery.

What is needed is a way to monitor the state, status or condition of a bed which cannot be successfully placed in communication with an existing communications system or network because of, for example, bed/network incompatibility, inability of the bed to produce signals indicative of bed parameters, or power loss.

SUMMARY

A method of determining information about a device, includes the steps of acquiring an image of at least a portion of the device, comparing the information content of the image to the information content of at least one record of a library and, if the comparison is positive, reporting that the device is in the possible state represented by the library record. A related system is also disclosed.

BRIEF DESCRIPTION OF THE DRAWINGS

The foregoing and other features of the various embodiments of the methods and systems described herein will become more apparent from the following detailed description and the accompanying drawings in which.

DETAILED DESCRIPTION

Figure 1:
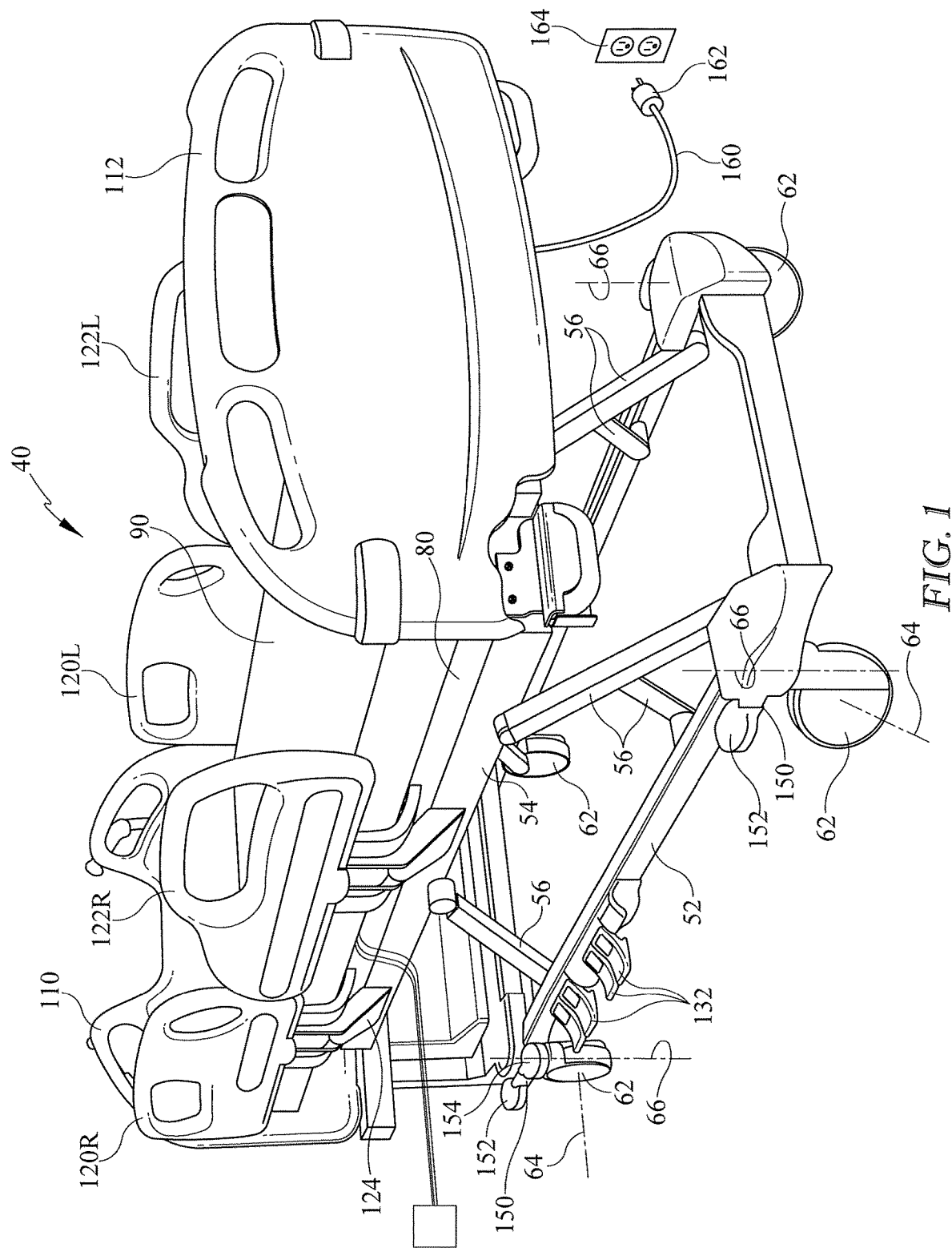
FIG. 1 is a perspective view of a first hospital bed.

Reference will now be made to embodiments and examples which are illustrated in the accompanying drawings. Features similar to or the same as features already described may be identified by the same reference numerals already used. The terms "substantially" and "about" may be used herein to represent the inherent degree of uncertainty that may be attributed to any quantitative comparison, value, measurement or other representation. These terms are also used herein to represent the degree by which a quantitative representation may vary from a stated reference without resulting in a change in the basic function of the subject matter at issue.

FIGS. 1-5 show various features of three different but typical hospital beds 40. Not all beds necessarily have all the features described, however unless noted otherwise each described feature is present and illustrated in at least one of the typical beds of FIGS. 1-4.

A typical bed framework 50 extends longitudinally from a head end H to a foot end F and laterally from a left side L to a right side R where left and right are taken from the perspective of a supine bed occupant. The framework comprises a base frame 52 and an elevatable frame 54 supported on the base frame by lift system links 56. The links enable the elevatable frame to be positioned at different elevations relative to the base frame, and therefore relative to floor 60. The links also enable the elevatable frame to be placed in an inclined orientation relative to horizontal, and relative to the base frame, with either the head end lower than the foot end (referred to as the Trendelenburg position) or with the foot end lower than the head end (referred to as the reverse Trendelenburg position).

Figure 2:
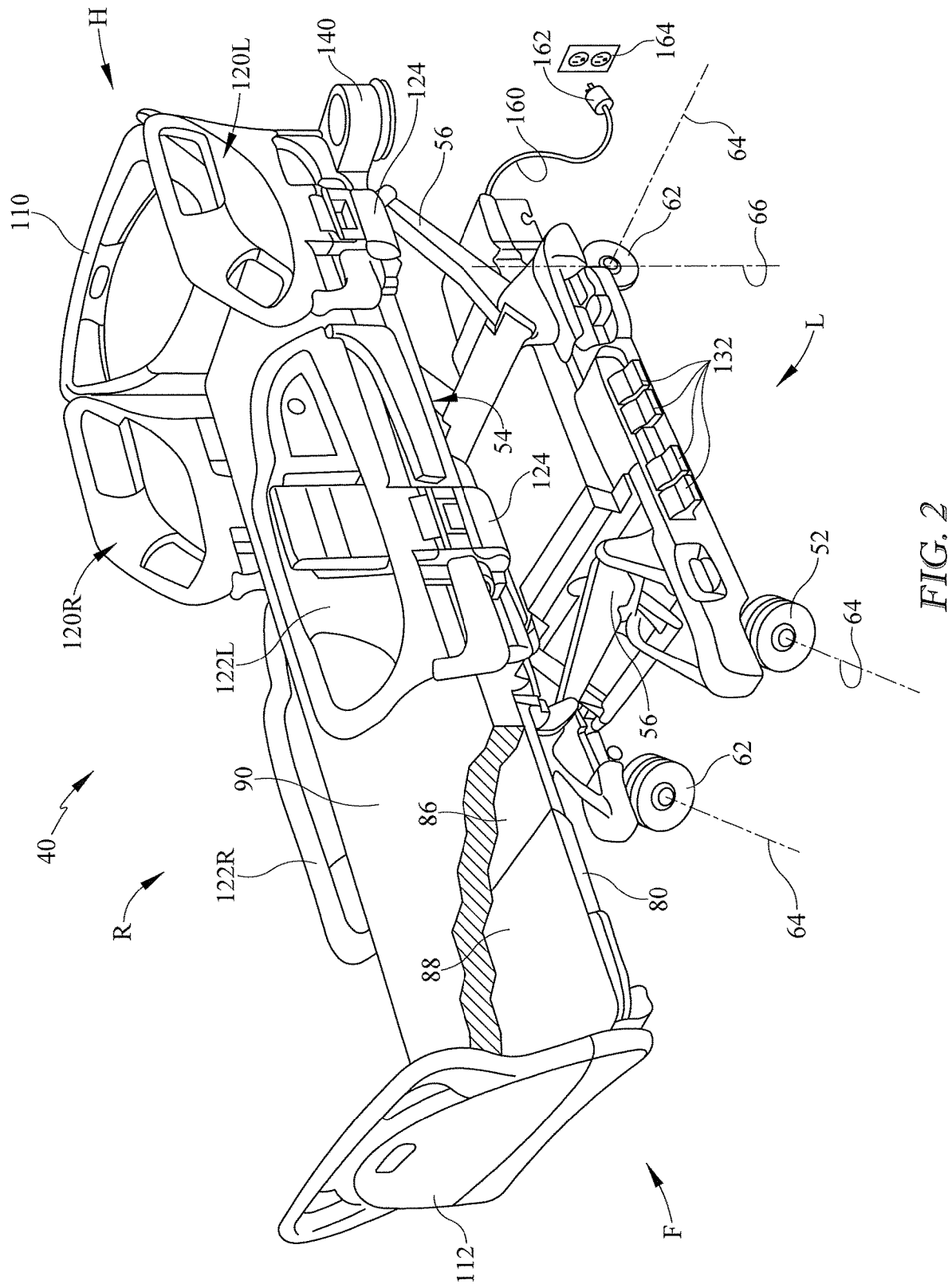
FIG. 2 is a perspective view of a second hospital bed in a bed-like configuration.
Figure 3:
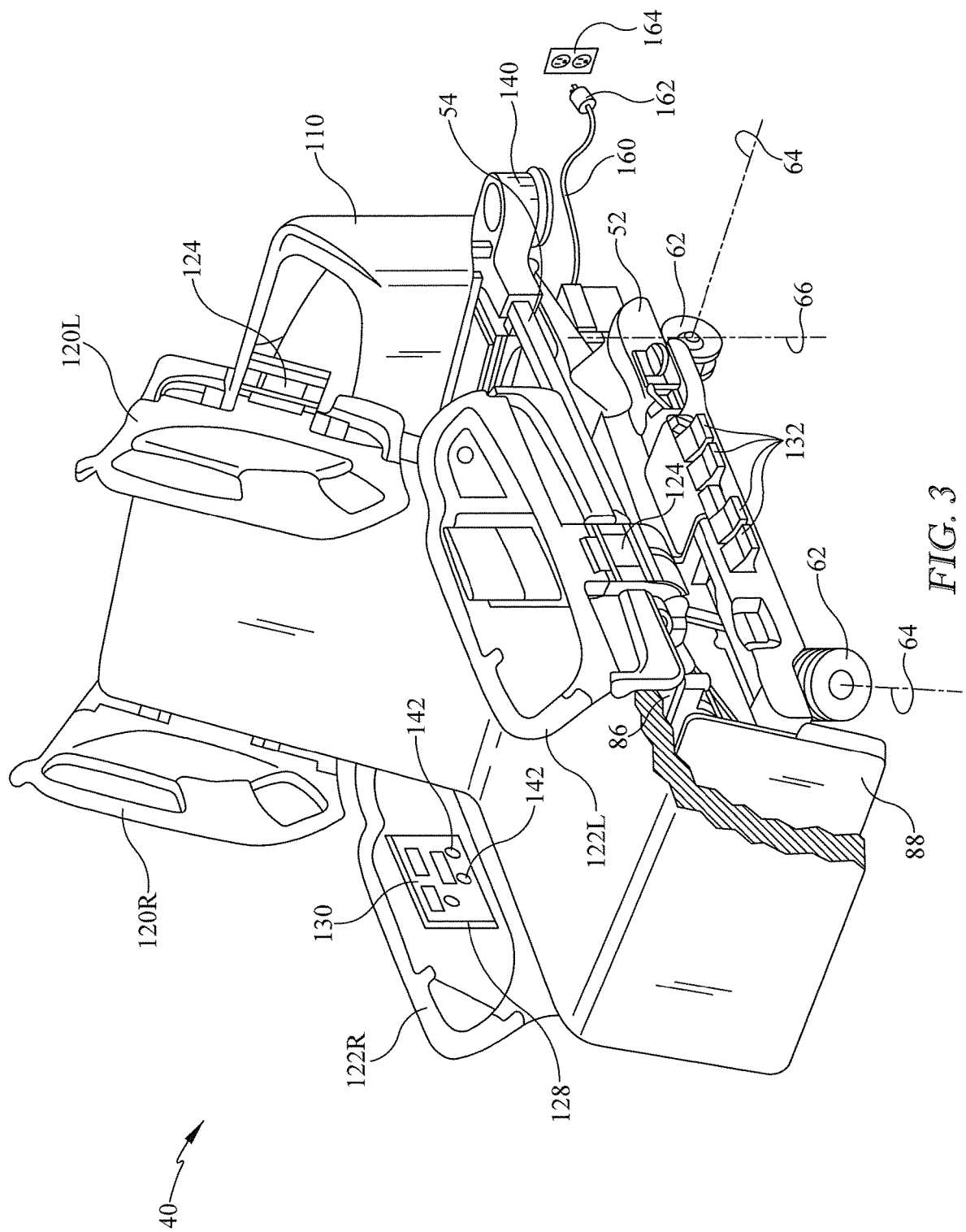
FIG. 3 is a perspective view of the second hospital bed in a chair-like configuration.
Figure 4:
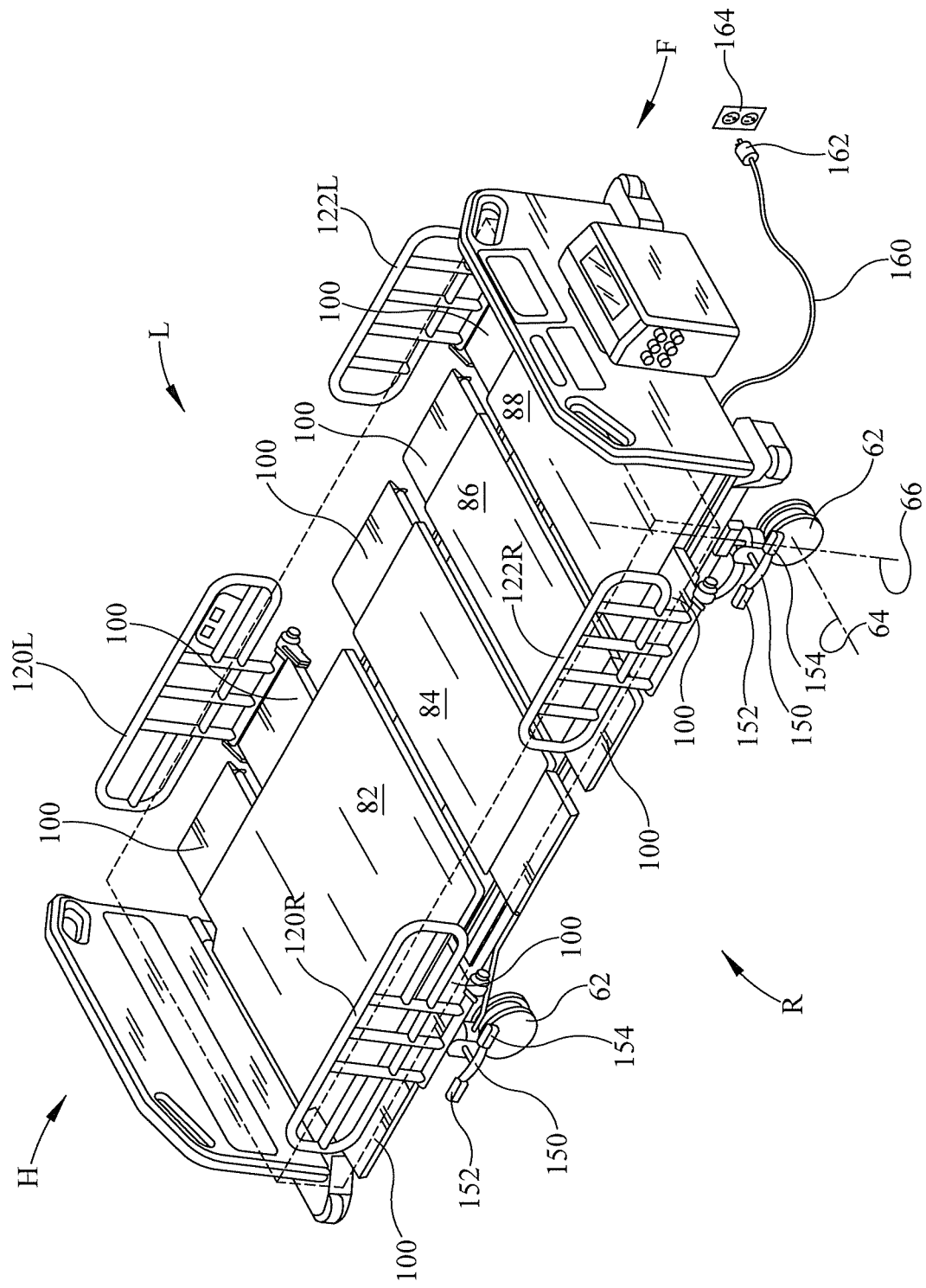
FIG. 4 is a perspective view of the framework of a third hospital bed.
Figure 5:
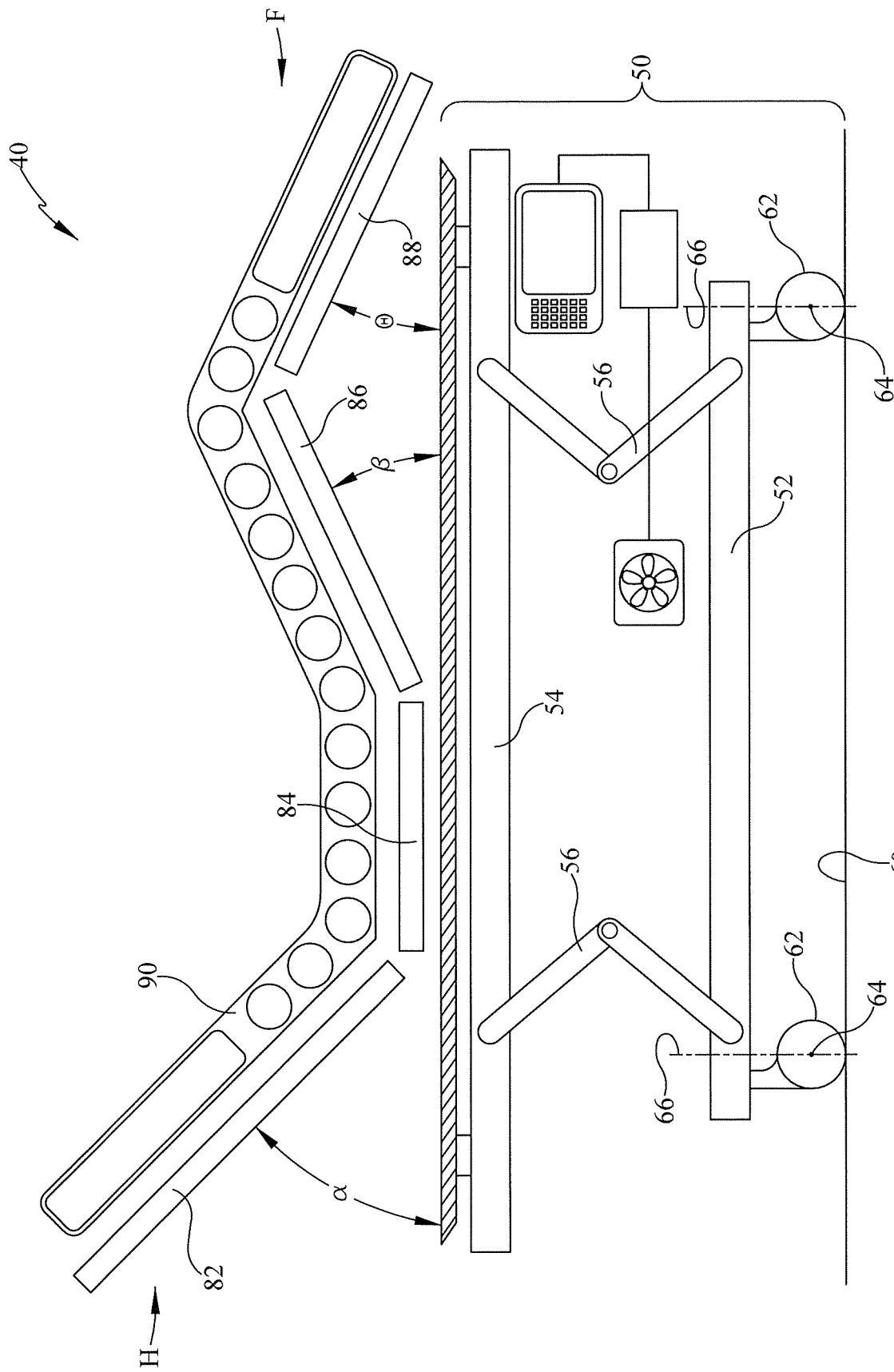
FIG. 5 is a schematic right side elevation view of a hospital bed.

Casters 62 extend downwardly from the base frame to floor 60. Each caster has a rotational axis 64 and a pivot axis 66. In FIGS. 1-3 the head end casters are aligned with the base frame, i.e. caster rotational axes 64 extend in the lateral direction. The foot end casters are non-aligned. In FIG. 4 both the head and foot end casters are aligned with the base frame.

The elevatable frame supports a deck 80. The illustrated deck is comprised of a torso or upper body section 82, which corresponds approximately to the torso of a properly positioned bed occupant, a seat section 84 corresponding approximately to the occupant's buttocks, a thigh section 86 corresponding approximately to the occupant's thighs, and a calf section 88 corresponding approximately to the occupant's calves and feet. As seen best in the schematic of FIG. 5 torso section 82 can be oriented at an angle α relative to the elevatable frame, thigh section 86 can be oriented at an angle β, and calf section 88 can be oriented at an angle θ. Some decks may have extension panels such as width adjustment panels 100 (FIGS. 4 and 19) which enable the width of the deck to be adjusted, or length adjustment panels 102 (FIG. 19) which enable the length of the deck to be adjusted.

The typical bed also includes a mattress 90, a headboard 110 and a footboard 112. The headboard and/or footboard of some beds may be easily removable by a caregiver (e.g. a nurse).

The typical bed also includes a left head end siderail 120L, a right head end siderail 120R, a left foot end siderail 122L, and a right foot end siderail 122R. A linkage 124 connects each siderail to the bed framework and imparts elevation adjustability to the siderail. Each siderail may be placed in one of two positions or states of elevation, a stowed position (the position of the right foot end siderail of FIG. 2) and in a deployed position (the position of all the other siderails of FIGS. 1-4). The siderails of some beds can also be secured in one or more intermediate positions between the stowed and deployed positions. The siderails of other beds can be easily installed on the bed or removed by a caregiver in addition to or in lieu of being deployable and stowable.

A typical bed may also include one or more user interfaces by means of which the bed occupant or a caregiver can issue commands for the bed to assume a desired state, for example a desired height of the elevatable frame, or a desired angular orientation of one of the orientation adjustable deck sections. One example user interface is a keypad 130 (FIG. 3). Another example user interface is one or more pedals 132 (FIGS. 1-3).

A bed may also include a holder 140 for an oxygen tank or other medical gases (FIGS. 2-3) and a power cord 160 with a plug 162 so that the bed can be connected to an electrical power source such as a wall outlet 164.

A typical bed may also include one or more indicator lights 142 (FIG. 3) to indicate, for example, that the bed requires service or maintenance or to indicate lockout status. Lockout is a condition in which a user interface has been intentionally disabled, usually to prevent its use by unauthorized persons.

Figure 7:
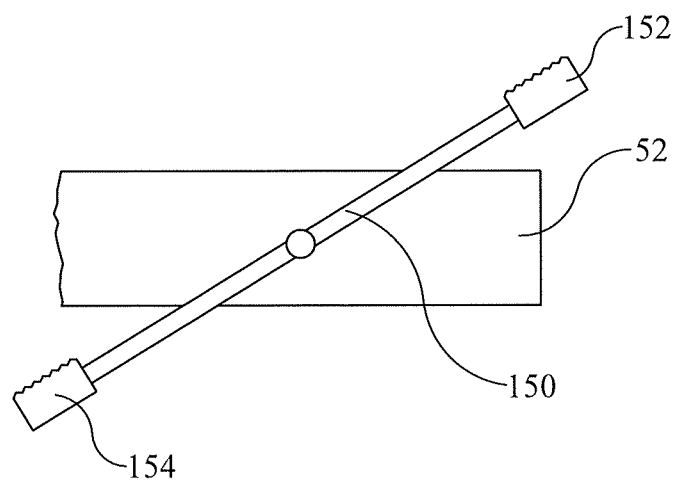
FIG. 7 is a schematic view of a portion of a hospital bed framework and a three position brake/steer pedal pivotably mounted thereon.
Figure 8:
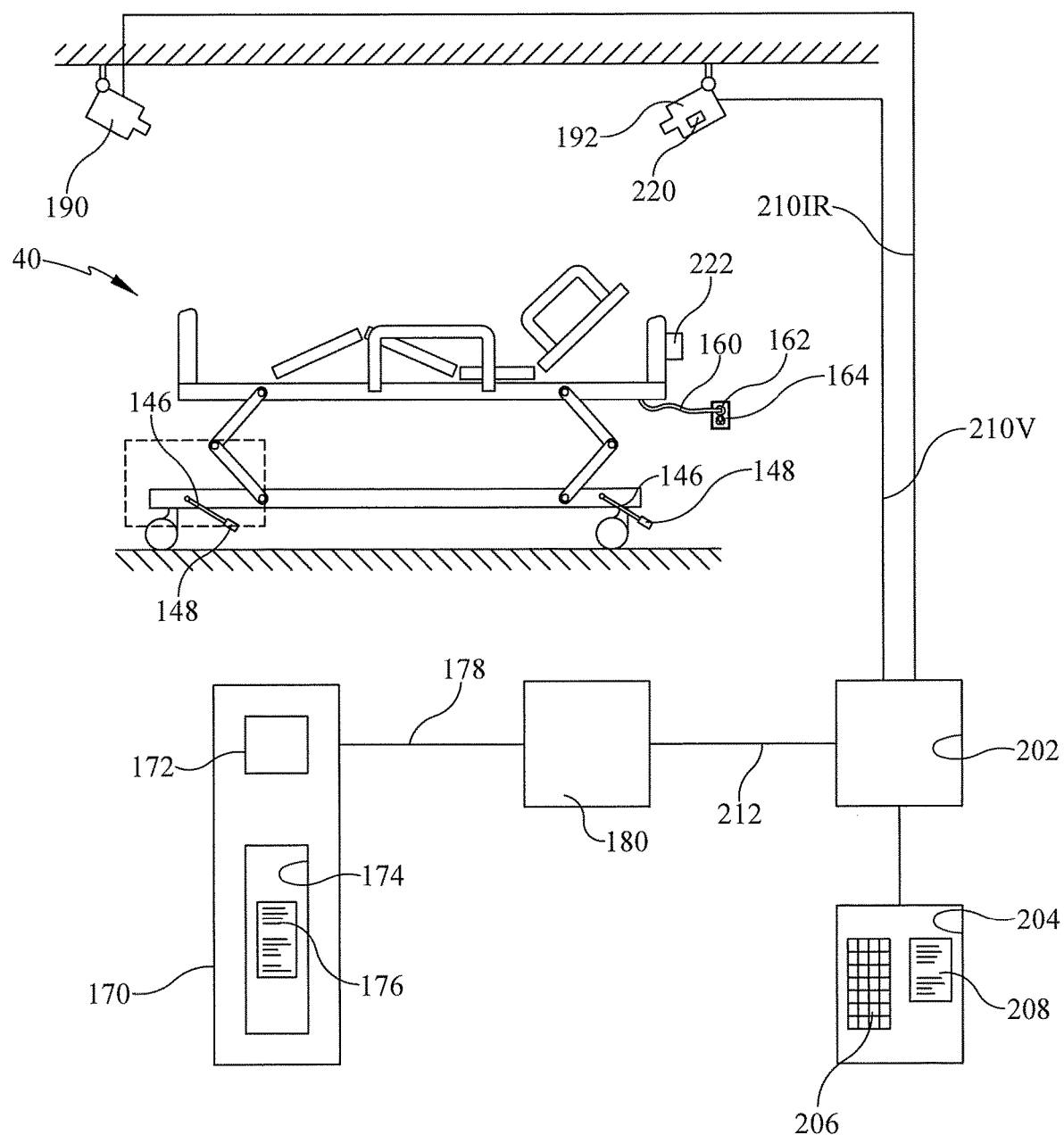
FIG. 8 is a schematic view showing, among other things, a hospital bed in a room, a visible spectrum camera, an infrared spectrum camera, a processor connected to the cameras, a memory containing a library of information and instructions executable by the processor, and a conventional data communications system.

Referring additionally to FIGS. 7-8, some beds may have a brake pedal 146 with a footpad 148. Brake pedal 146 is a two position pedal. The position illustrated with solid lines is the "brake ON" position or state of the pedal and the brake system. The position illustrated with dashed lines is the "brake OFF" position or state of the pedal and the brake system. downwardly from the base frame.

Referring additionally to FIG. 7, a typical bed may also include one or more three position brake and steer pedals 150 each having a headward end footpad 152 and a footward end footpad 154. When a person presses the pedal down by way of one of the footpads, for example the footward end pad as seen in the illustration, each of the four casters is locked so that it can neither roll about its rotational axis 64 nor pivot about its pivot axis 66. This is referred to as the "brake ON" mode and the pedal is referred to as being in its "brake ON" position or state. Similarly, the brake system is in the "brake ON" state.

When neither footpad is pressed down and the pedal is essentially horizontal, each of the four casters can rotate about its rotational axis and can also pivot about its pivot axis. This is referred to as the steer mode, and the pedal is referred to as being in its neutral position or state. Similarly, the brake system is in the "neutral" or "steer" state. The steer mode/neutral position is helpful when a caregiver needs to move the bed sideways or maneuver it in confined spaces.

When the headward end footpad is pressed down each of the four casters can rotate about its rotational axis, and each head end caster can rotate about its pivot axis. However each foot end caster can rotate about its pivot axis only if it is not aligned with the base frame, and then only until movement of the bed along the floor causes the nonaligned caster to pivot into alignment with the base frame, at which time the caster becomes pivotally locked and therefore remains aligned. This is referred to as the transport mode, and the pedal is referred to as being in its transport position or state. Similarly, the brake system is in the "transport" state.

FIG. 8 shows a typical hospital bed 40 in a room, and a conventional data communications system or network 170. The conventional data communications system may include a first processor 172 and a first memory 174 which contains a first set of instructions 176. The instructions are executable by the processor or can be put in a form which renders them executable by the processor. As described in the background section of this application, signals representative of sensed parameters of the bed are conveyed across the network (e.g. across connection 178) to one or more destinations 180. The illustrated data connections in this patent application suggest physical connections (e.g. wires or optical fibers) however the connections could be wireless or fiberless connections. One example destination is a nurses' stations where the information content of the signals is presented in human understandable form, such a text or graphics, on a video screen. Another example destination is a database in a memory where the information content of the signals is stored for future retrieval.

FIG. 8 also shows a visible spectrum camera 190, an infrared spectrum camera 192, a second processor 202 and a second memory 204. A data connection 210V, 201IR enables communication between the cameras and the processor. Memory 204 contains a library 206 of information and a second set of instructions 208 which are executable by processor 202 or which can be put in a form so that they are executable by the processor. A connection 212 puts the processor in communication with one or more destinations 180. Processor 202 and memory 204 are illustrated as distinct from processor 172 and memory 174 of the conventional data communication network. However the instructions 208 and the library 206 associated with the inventive concepts describe herein may be stored in memory 174, and the execution of those instructions may be carried out by processor 172 or any other suitable processor. Accordingly, the balance of this specification either makes no distinction concerning which processor carries out the instructions of the inventive method described herein, or makes a nonlimiting reference to a specific processor.

FIG. 8 also shows an RFID reader 220 affixed to camera 192 and an RFID tag 222 affixed to the bed. The RFID reader may be located at other locations provided that communication between the reader and the tag can take place.

This specification will now describe methods of determining status information about a device such as a bed. The overall status of a bed is defined by the statuses of its various parts, components, features, systems and subsystems. The statuses of the parts, components, features, systems and subsystems, rather than the status of the bed as a whole, may sometimes be of interest. Therefore, the phrase "determining status information about a device" and similar phrases includes determining status information about parts components, features, systems and subsystems of the device/bed even if not explicitly stated.

A method of determining status information about the bed may include a first preparatory step of determining whether or not a bed is present in the room. The step of acquiring an image is carried out only if a bed is determined to be present. In one embodiment the presence of a bed is confirmed or refuted with the RFID components 220, 222. In another embodiment the presence of a bed is confirmed from images obtained from one of the cameras. For example an image from the visible spectrum camera may be conveyed to the processor and analyzed to determine if the information content of the image is consistent with the presence of a bed. The analysis may be carried out by comparing the information content of the image to the information content of one or more records in library 206 which are consistent with the presence and/or absence of a bed and, based on the comparison, concluding whether or not a bed is present. Other image analysis techniques may also be satisfactory.

If the presence/absence analysis confirms the presence of a bed, the method of determining status information about the bed may also include a second preparatory step of determining the make (manufacturer) and model of the bed. If the bed model can be determined, then the library records compared to the acquired image at block 254 can be limited to only those records associated with that model. In one embodiment the make/model determination, like the presence/absence determination, may make use of the RFID components. If the communications network supplier and the bed manufacturer are the same entity (e.g. N1 and B1) the bed manufacturer may simply affix the RFID tag to the bed during its manufacture and/or retrofit previously delivered beds with a tag. If the health care facility also uses beds manufactured by manufacturer B2, manufacturer B1 (or B2) can produce RFID tags indicating the make/model of the B2 beds and cause those tags to be affixed to the B2 beds.

In another embodiment the make and model of the bed are determined based on one or more physical features of the bed. One example physical feature is an emblem such as a manufacturer's logo and/or model designation which is in a visible location on the bed. An image of the bed, or of the portion or portions of the bed where the make/model information is present may be conveyed to the processor and analyzed to determine the make/model of the bed. In this specification, "image of the bed" and similar phrases are intended to also refer to a portion or portions of the bed. In addition the phrase "image of the bed" and similar phrases include the surroundings of the bed when the state of the bed depends on the surroundings, such as whether or not a bed power cord occupies an electrical outlet, even though "surroundings" is not explicitly used. The analysis may be carried out by comparing the information content of the image to the information content of one or more library records which show the logos and model designations of manufacturers' beds as they appear on the beds themselves. Other analysis techniques such as character recognition by a trained neural network may also be satisfactory.

Figure 9A:
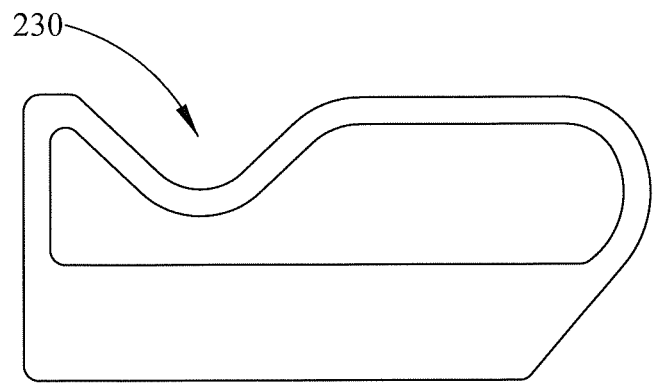
FIGS. 9A-9C are schematic side elevation views of different siderails of a hospital bed illustrating an example of how a bed make and model can be identified by a physical characteristic unique to the make and model.
Figure 9B:
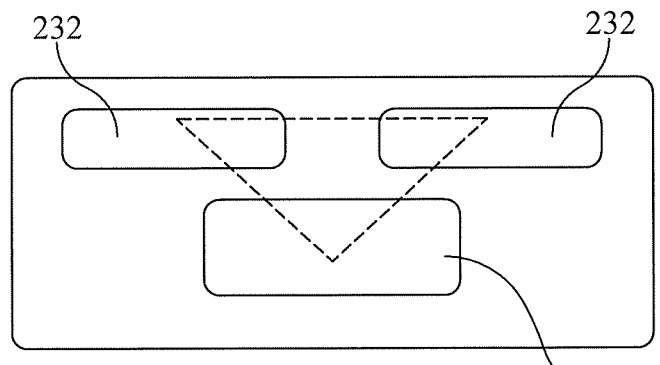
Figure 9C:
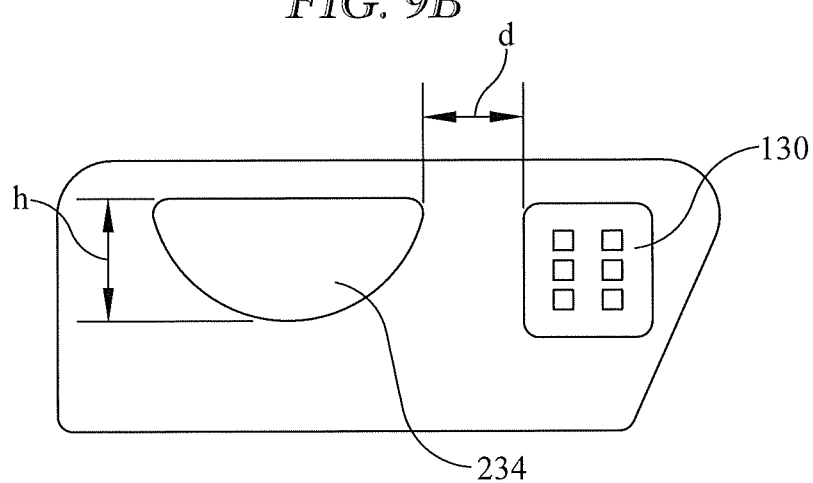

Another example physical feature is a distinctive characteristic of the bed other than a logo or model designation. FIGS. 9A-9C show three siderails, each having a physical characteristic unique to a particular make and/or model of the bed. The siderail of FIG. 9A includes an egress assist contour 230 unique to manufacturer A. The siderail of FIG. 9B features a triplet of openings 232 in a triangular arrangement unique to manufacturer B. The siderail of FIG. 9C is unique to manufacturer C and includes an opening 234 with straight and curved borders and a keypad 130 spaced from the opening by a distance d which is approximately equal to the height h of the opening. An image of the siderail may be conveyed to the processor and analyzed to determine whether the siderail is characteristic of a known make/model of the bed. The analysis may be carried out by comparing the information content of the image to the information content of one or more library records whose information content corresponds to siderails of different manufacturers' beds. Other image analysis techniques may also be satisfactory.

As is evident from the foregoing, it may be necessary to inspect not only physical features, but also interfeature relationships to identify a make/model. For example the siderail of FIG. 9B may be unique to manufacturer B not merely because of the presence of three openings, but because of the presence of those opening in a triangular pattern. The siderail of FIG. 9C may be unique to manufacturer C because of the combination of the shape of the opening (combination of curved and straight borders), the presence of the keypad, and the d=h relationship between them.

Figure 10A:
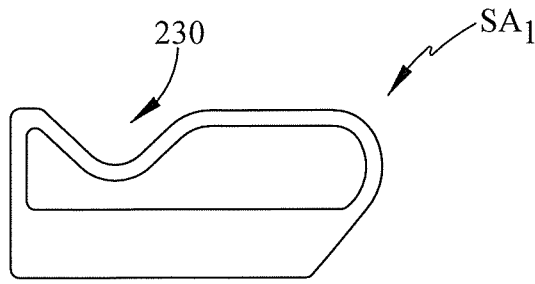
FIGS. 10A-10C are schematic side elevation views of different siderail/caster combinations of a bed illustrating an example of how a bed make and model can be identified by a combination of physical features.
Figure 10A:
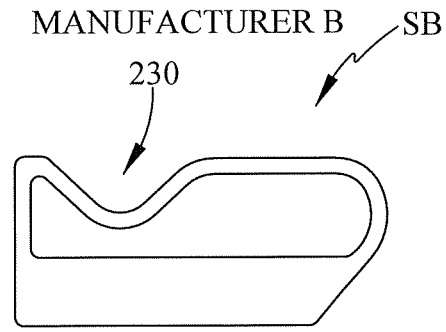
Figure 10A:
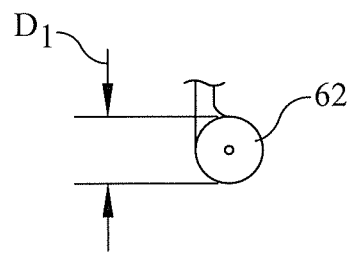
Figure 10B:
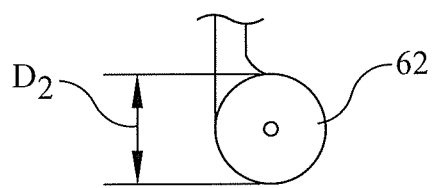
Figure 10C:
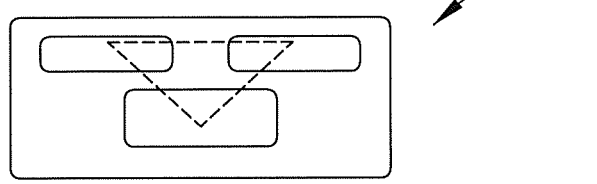
Figure 10C:
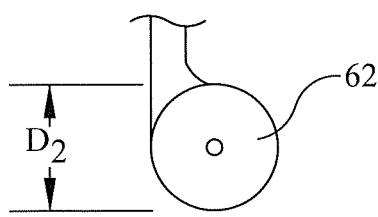

It may be necessary to inspect multiple features and/or interfeature relationships to positively identify a bed make/model. For example the physical differences between siderail SA1 of FIG. 10A (manufacturer A) and siderail SB of FIG. 10B (manufacturer B) may be subtle enough to prevent a positive identification of the make/model However if it is known that beds produced by manufacturer A with siderail SA1 always have small diameter D1 casters, and that all beds produced by manufacturer B with siderail SB have large diameter D2 casters, caster diameter distinguishes between manufacturers A and B. Referring to FIG. 10C, caster diameter alone may not be sufficient to distinguish between manufacturers A and B if, for example, manufacturer A also offers beds with a distinctly different siderail SA2 in combination with large diameter D2 casters. Hence, it is the combination of the siderail contour 230 and caster diameters D1, D2 that first narrows the possibilities to manufacturers A and B and then allows a distinction between manufacturers A and B.

Positively identifying a bed as that of a particular manufacturer will, without additional information, usually not suffice to distinguish between different models offered by that manufacturer. However positively identifying a bed as a particular model will also identify the manufacturer.

As is evident from the foregoing, the methods described herein may employ the concept of comparing the information content of an image to the information content of one or more library records. This specification may use more abbreviated phraseology such as "comparing the image to the library records" or "inspecting the library records" to refer to this same concept.

Figure 6:
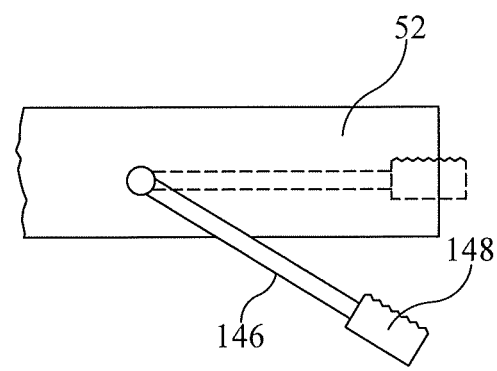
FIG. 6 is a schematic view of a portion of a hospital bed framework and a two position brake pedal pivotably mounted thereon.
Figure 11:
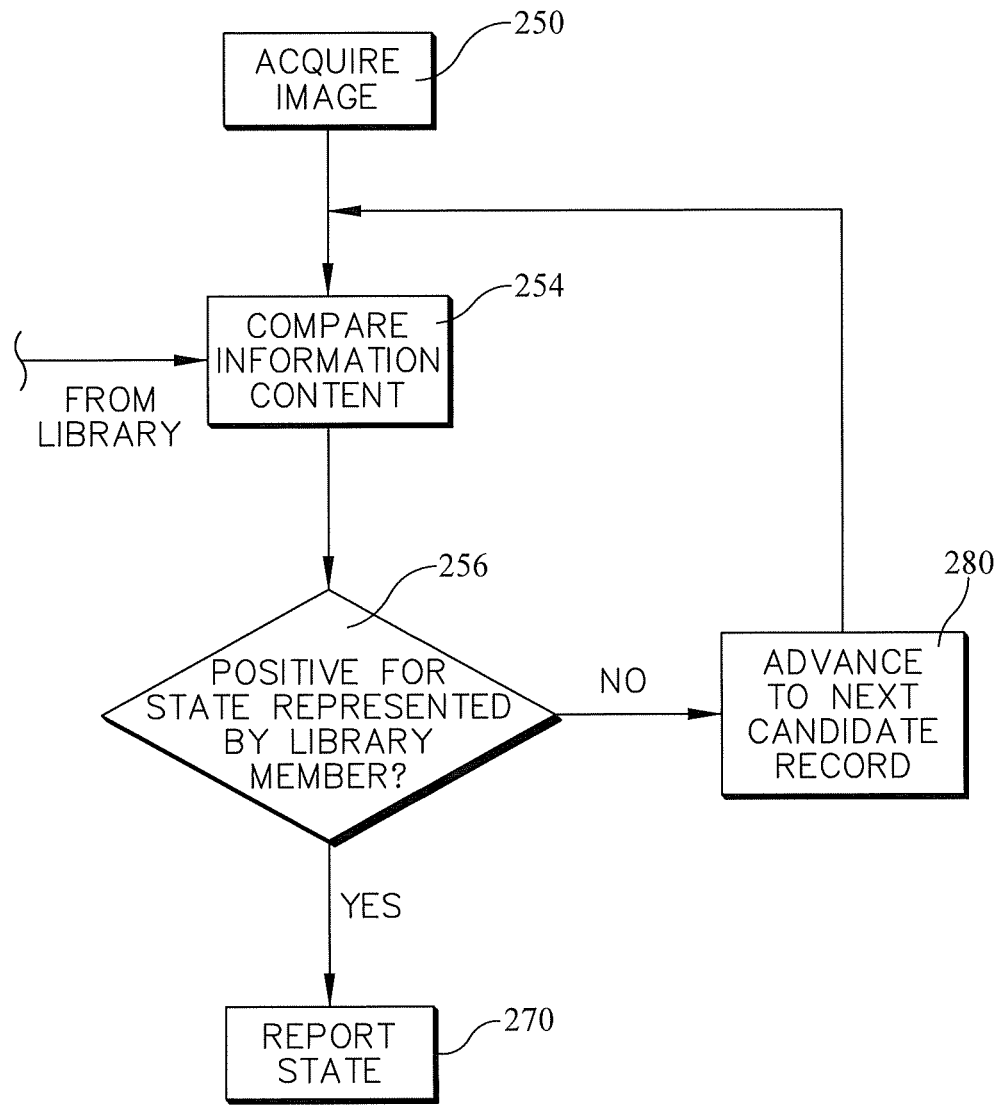
FIG. 11 is a block diagram illustrating a method of determining the state of a device, for example a hospital bed, from visually discernible information such as the information content of an image of the device or a portion thereof and in which the image of the device is considered to be a match for a library record if the comparison of the information content of the image and the information content of the library record is positive.

FIG. 11 is a block diagram illustrating a method of determining the state of a device, for example a hospital bed, from visually discernible information such as the information content of an image of the device or a portion thereof. Referring to FIGS. 8 and 11, at block 250 the method acquires an image of at least a portion of the bed and may also acquire an image of the relevant surroundings such as electrical outlet 164. The image may be obtained through camera 190. The image has information content from the field of view of the camera. In this application the information content of the image is shown by human recognizable illustrations. In practice the information content may be in a different form, or may be converted to a form, that enables processor 202 to compare the information content of the image to the information content of library members (described below) when the processor executes appropriate instructions 208. By way of example the image under consideration may be the image of brake pedal 146 of FIG. 6 or the pedal 146 within the dashed outline of FIG. 8.

Figure 12:
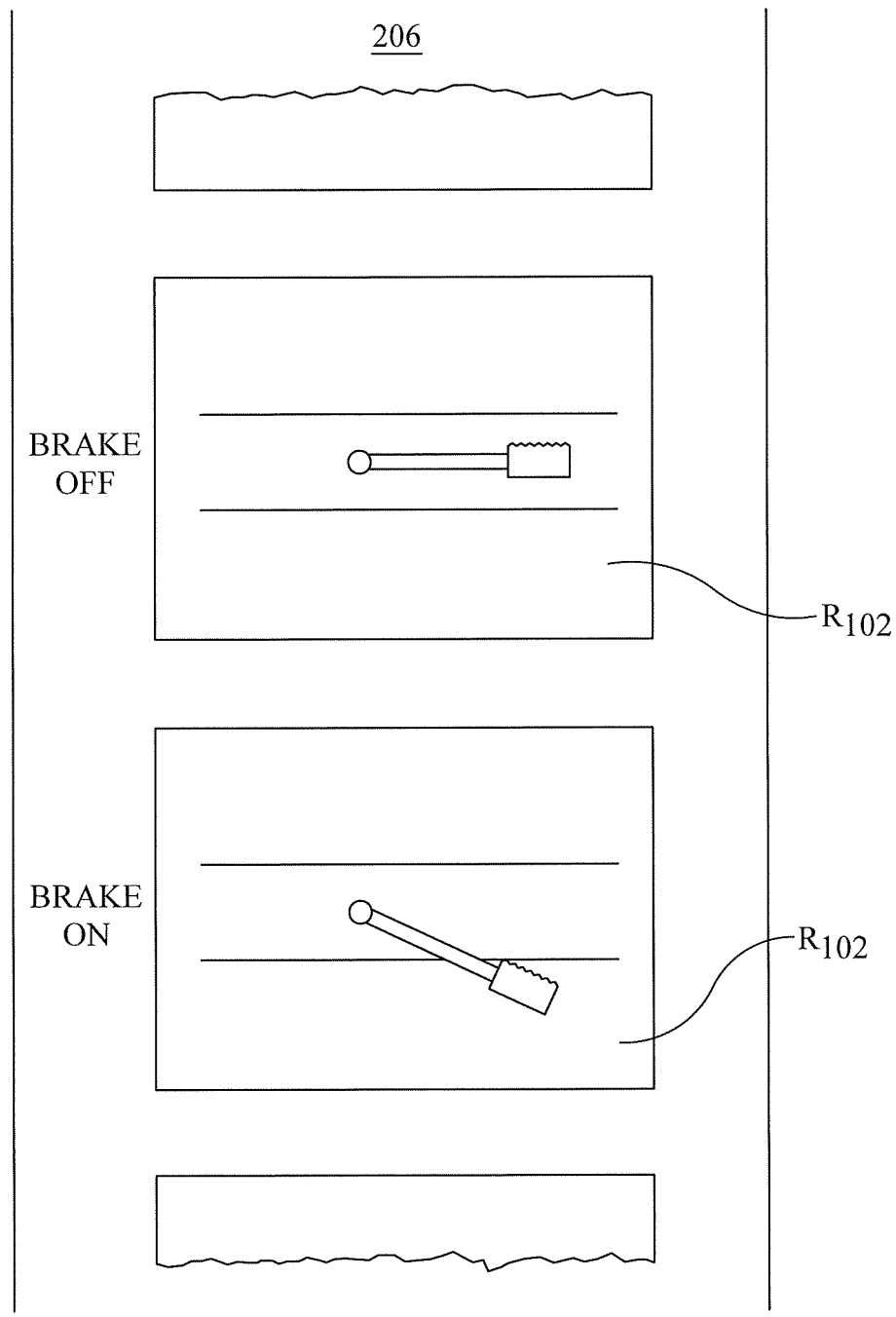
FIG. 12 is a schematic illustration showing two members of a library each having information content consistent with one of two possible states of a hospital bed brake pedal which can be positioned in only the two states corresponding to the library members.

At block 254 the method compares the information content of the image to the information content of one or more members or records of a library, such as library 206 (FIG. 8). In this specification "member" and "record" are used interchangeably when referring to the contents of the library. Library 206 includes two or more records. Each record contains information about a possible state of the bed. In this application the information content of the library records is shown by human recognizable illustrations. In practice the information content may be in a different form, or may be converted to a form, that enables processor 202 to compare the information content of the library records to the information content of the camera image under consideration when the processor executes appropriate instructions. FIG. 12 shows an example of two library members, $R_{101}$, $R_{102}$ each having information consistent with one of two possible states, ON (record $R_{102}$) and OFF (record $R_{101}$), of a brake pedal 146.

In the present example, ON and OFF are the only possible states of the brake pedal and are considered to be states which are complements of each other. In this specification, "complement" and its variants are used when there are only two possible states. More formally, if there are two and only two possible states $S_1$, $S_2$ for a component, such as the ON ($S_1$) and OFF ($S_2$) brake pedal states, a comparison which is negative for one of the two complements may be considered to be positive for the other of the two complements. When there are three or more mutually exclusive, collectively exhaustive possible states this specification may refer to those states as "counterstates" of each other. For example if there are three states $S_1$, $S_2$, $S_2$ for a component, $S_2$ and $S_3$ are each counterstates of $S_1$; $S_1$ and $S_3$ are each counterstates of $S_2$; and $S_1$ and $S_2$ are each counterstates of $S_3$. The limit case of two complementary states can also be referred to as being in a counterstate relationship with each other.

At block 256 the method determines if the comparison at block 254 was a positive comparison. A positive comparison is one in which the information content of the image and the information content of the library record are sufficiently similar, within a tolerable error, that it is justified to conclude that the state of the bed or portion of the bed represented by the library record is the same as the state of the bed or portion of the bed as represented in the image under consideration. For example a comparison of the image under consideration (dash-outlined region of FIG. 8) to library record $R_{102}$ of FIG. 12 is a positive comparison which justifies the conclusion that the brake pedal in the image is in the state represented by record $R_{102}$, i.e. that the brake is ON. The positive comparison may be referred to as a "match". A negative comparison is one in which the information content of the image and the information content of the library record are sufficiently dissimilar that it is not justified to conclude that the state of the bed or portion of the bed represented by the library record is the same as the actual state of the bed or portion thereof as represented in the image. For example a comparison of the image under consideration (dash-outlined region of FIG. 8) to library record $R_{101}$ is a negative comparison which does not justify the conclusion that the brake pedal in the image is in the state represented by record $R_{101}$, i.e. it is not justified to conclude that the brake is OFF. A negative comparison may also be thought of as one in which the information content of the image and the information content of the library record are sufficiently dissimilar to justify the conclusion that the state of the bed or portion of the bed represented by the library record is not the same as the actual state of the bed or portion thereof as represented in the image under consideration.

If the comparison is positive for the state represented by a library record, the method proceeds to block 270 and reports that the bed or the imaged portion thereof is in the possible state represented by the library record. If the comparison is negative the method branches to block 280 and advances to the next candidate record. The concept of a candidate record is described in more detail below. The method then returns to block 254 and repeats the process until a positive comparison is obtained or until all candidate records have been inspected without obtaining a positive comparison.

In general it is expected that the method will be required to perform multiple comparisons in series or in parallel in order to identify a library record that compares positively to the image. The examples in this application are based on sequential comparisons, however parallel comparisons are within the scope of the disclosed subject matter.

Figure 13:
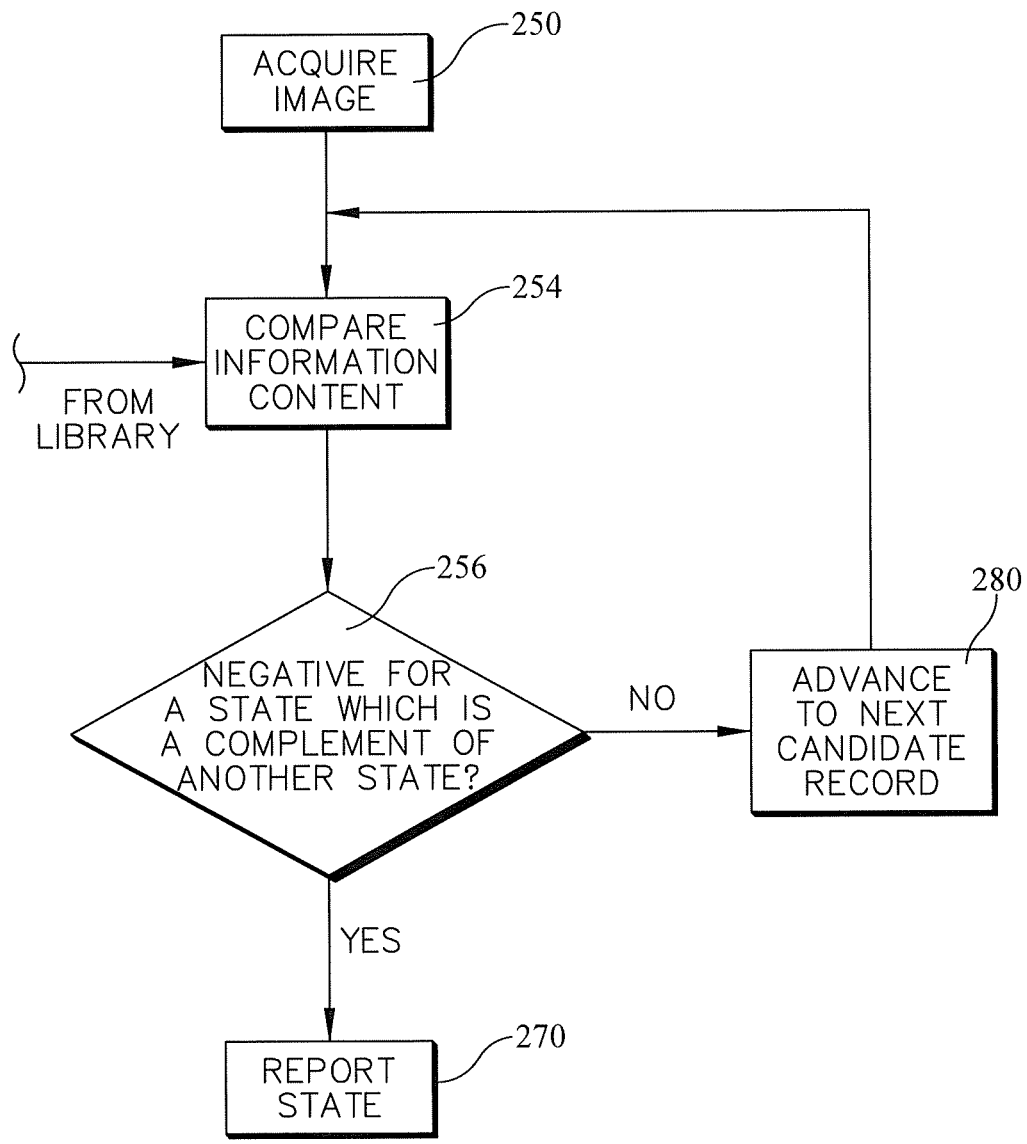
FIG. 13 is a block diagram showing a variation on the method of FIG. 11 in which an image of a device is considered to be a match for a first library record if the comparison of the information content of the image and the information content of a second library member is negative and if the first and second library members are complements of each other.

FIG. 13 is a block diagram showing a variation of the method of FIG. 11. The method steps at blocks 250, 254, 270 and 280 are the same as those of FIG. 11. At block 256 the method determines if the comparison at block 254 was negative for a state which is a complement of a state represented by some other library record. In this example library records $R_{101}$ and $R_{102}$ represent states which are complements of each other. Therefore a comparison of the image under consideration (dash-outlined region of FIG. 8) to library record $R_{101}$ is a negative comparison for a state (Brake OFF) which is known to be a complement of some other state (brake ON). This may justify the conclusion that, because there are only two possible states, the brake is ON. Alternatively, the conclusion that the brake is not OFF is also justified. A negative comparison between an image and a library record which is known to be a complement of some other library record may be referred to as a "match" between the image and the other library record, even though the other library record may not have been examined. However depending on the ramifications of an incorrect conclusion, it may be desirable to not conclude that the bed is in a particular state based on negative comparisons alone, but to instead reach that conclusion only if a positive comparison is obtained.

Depending on the outcome of the test at block 256 the method either branches to block 270 and issues a report (e.g. "BRAKE NOT OFF", or "BRAKE ON") or branches to block 280 and advances to the next candidate record. The method then returns to block 254 and repeats the process until a positive comparison is obtained or until all candidate records have been inspected without obtaining a positive comparison.

Figure 14:
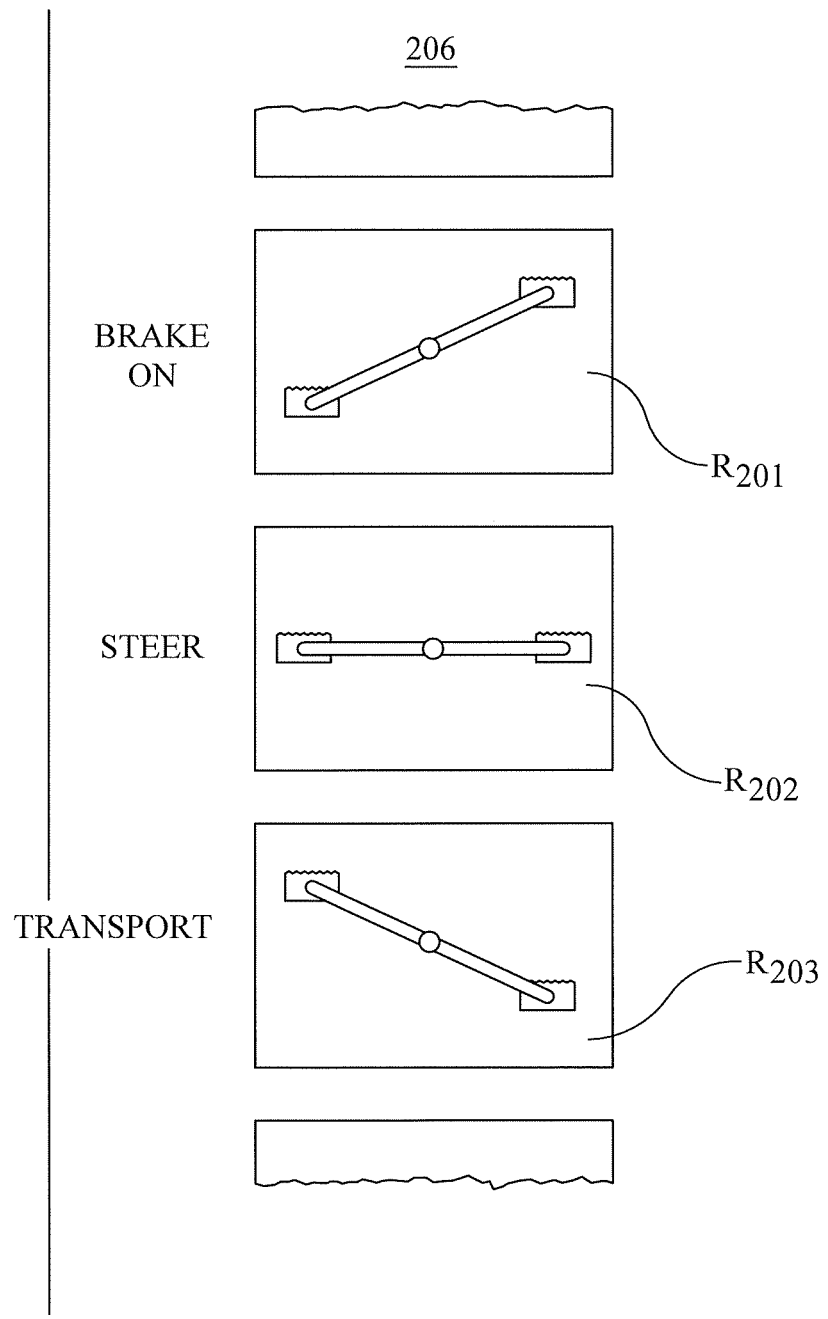
FIG. 14 is a view similar to FIG. 12 showing three members of a library each having information content representing one of the three possible states of a brake/steer pedal.

FIG. 7 shows a brake/steer pedal which is positionable in only three positions or states (brake ON, neutral, transport) as described previously in this specification. The pedal as illustrated is in its "brake ON" position or state. FIG. 14 shows three library records each having information content representing one of the three possible states for the brake/steer pedal, "brake ON" (record $R_{201}$), "steer mode" (record $R_{202}$) and "transport mode" (record $R_{203}$). Because there are more than two possible useful states for the brake/steer pedal, the states are considered to be in a counterstate relationship with each other. By way of example, an image whose information content compares negatively for the "brake ON" state may be considered to be positive for its counterstates, i.e., the pedal is not in the "brake ON" state and therefore must be in one of the counterstates, steer or transport. If a set of comparisons is negative for all but a remaining one of multiple counterstates then it may be justified to conclude that the bed is in the remaining one state and to make a report to that effect. In general, if there are M possible counterstates the method needs negative comparisons of the image under consideration to M−1 of the counterstate library records in order to conclude that the bed or portion thereof is in the state corresponding to the remaining library record. Depending on the ramifications of an incorrect conclusion, it may be desirable to not conclude that the bed is in a particular state based on negative comparisons alone, but to instead reach that conclusion only if a positive comparison is obtained.

Figure 15:
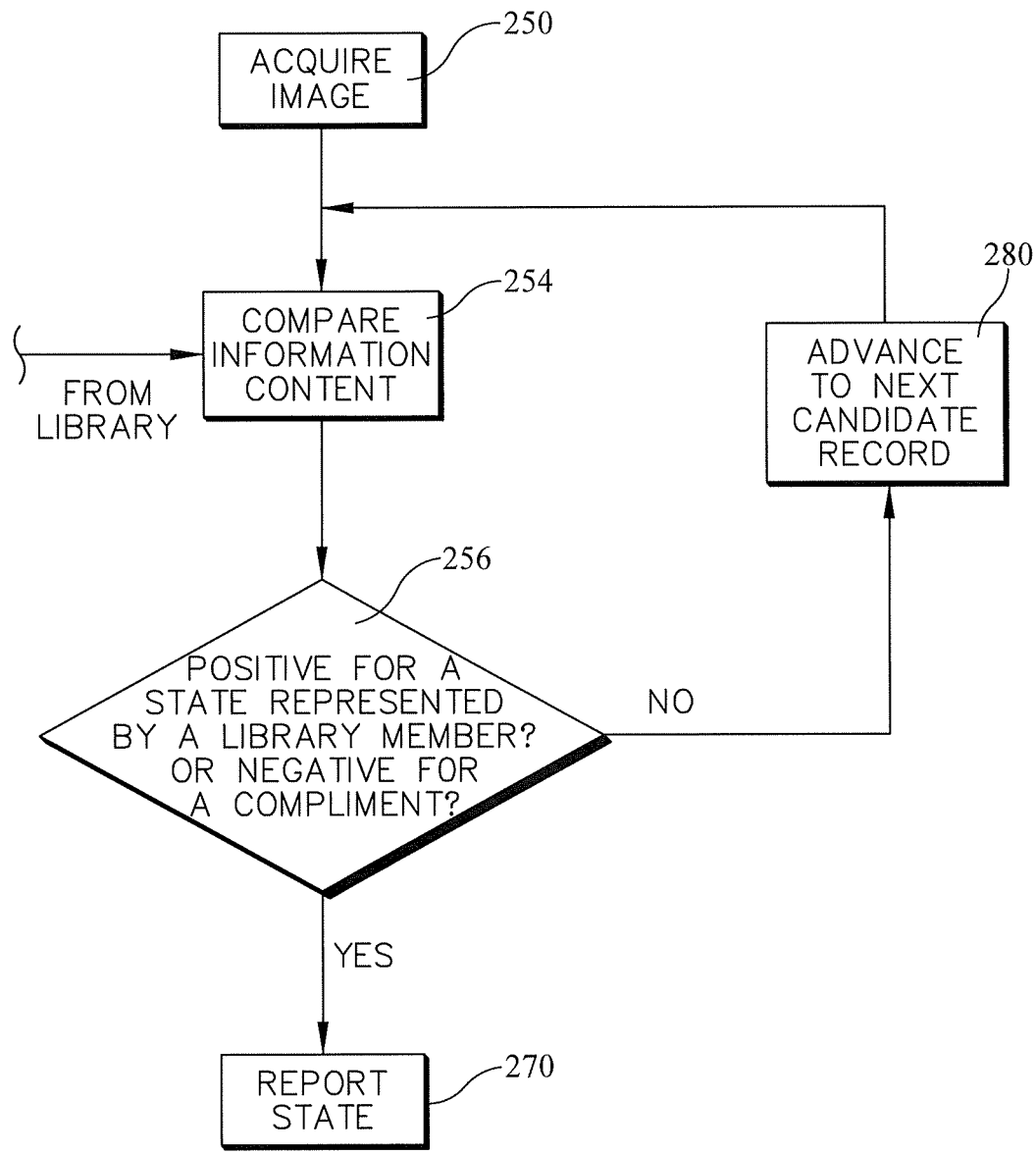
FIG. 15 is a block diagram illustrating a method that includes both the positive test of FIG. 11 and the negative test of FIG. 13.

FIG. 15 is a block diagram which combines the positive comparison test of FIG. 11 with the negative comparison test of FIG. 13. The method of FIG. 15 applies specifically to the case of two complementary states but can be modified with additional tests to apply to three or more counterstates. The modifications can also account for interim reports that could be made, if desired, as the method narrows down the possibilities. For example if there are five possible states and it has been determined that the bed is not in three of those states, the method can report that fact.

The foregoing examples demonstrate how parameters such as brake status and brake/steer status can be determined and reported by acquiring an image and evaluating its information content rather than by the traditional methods of using data from sensors installed on the beds and conveying signals representative of the sensed parameters to the communications network by way of a network interface unit and then across the network to their destinations. The fundamentals of the method can also be used to determine parameters other than brake status and brake/steer status as explained in several examples of the paragraphs that follow.

Figure 16:
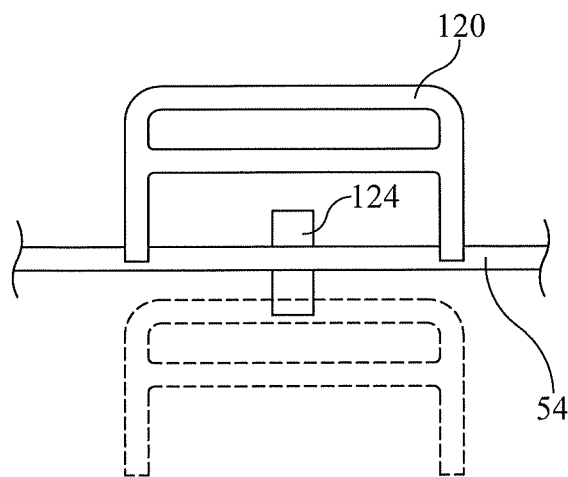
FIGS. 16-20 are schematic elevation views of a hospital bed or a portion thereof presented in the context of examples of how the methodology described herein can be used to determine the state of bed features other than a brake pedal or a brake/steer pedal.

Referring to FIG. 16, the elevation state of a siderail may be determined by comparing an image of a siderail and a reference component to library records whose information content represents the positional relationship between the siderail and the reference component for various elevational states of the siderail. In the example of FIG. 16 the reference component is elevatable frame 54, and siderail 120 is shown in both a deployed state (solid lines) and a stowed state (dashed lines). The library contains at least a library record whose information content represents the deployed state and a record whose information content represents the stowed state. The method can therefore determine if the siderail is in the deployed state or the stowed state.

Figure 17:
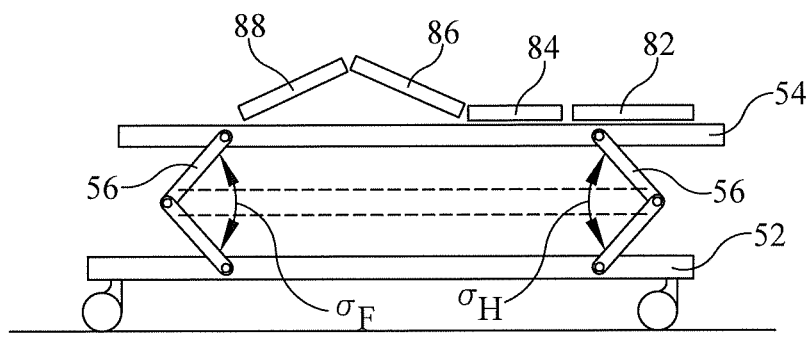

Referring to FIG. 17, elevation state of an elevation adjustable frame may be determined by comparing an image containing an elevatable frame and a reference component to library records whose information content represents the positional relationship between the elevatable frame and the reference component for various elevational states of the elevatable frame. In the example of FIG. 17 the reference component is base frame 52, and elevatable frame 54 is shown at both its highest elevation (solid lines) and its lowest elevation (dashed lines). (Lift system links 56 are illustrated only for the highest elevation of the elevatable frame). The library contains at least a record whose information content represents the highest elevation state and a record whose information content represents the lowest elevation.

Figure 18:
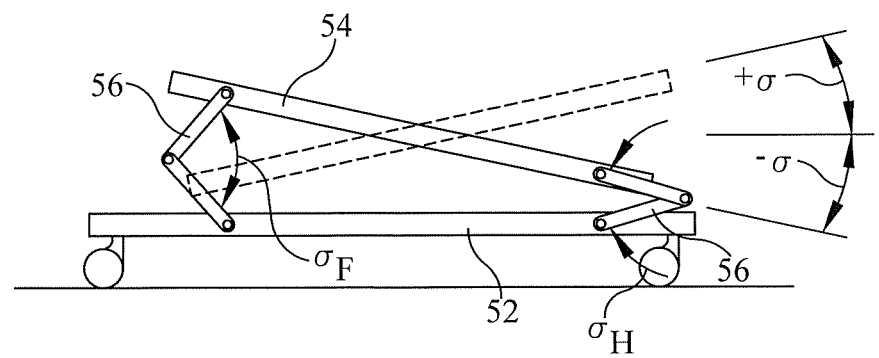

Referring to FIG. 18, the orientation of the elevatable frame may be determined by comparing an image containing the elevatable frame and a reference component to library records whose information content represents the positional relationship between the elevatable frame and the reference component for various orientations of the elevatable frame. In the example of FIG. 18 the reference component is base frame 52. Elevatable frame 54 is shown in both a maximum head down orientation (solid lines) and a maximum foot down orientation (dashed lines). (Lift system links 56 are illustrated only for the head down orientation.) The library contains at least a record whose information content is consistent with the maximum head down orientation and a record whose information content is consistent with the maximum foot down orientation.

Figure 19:
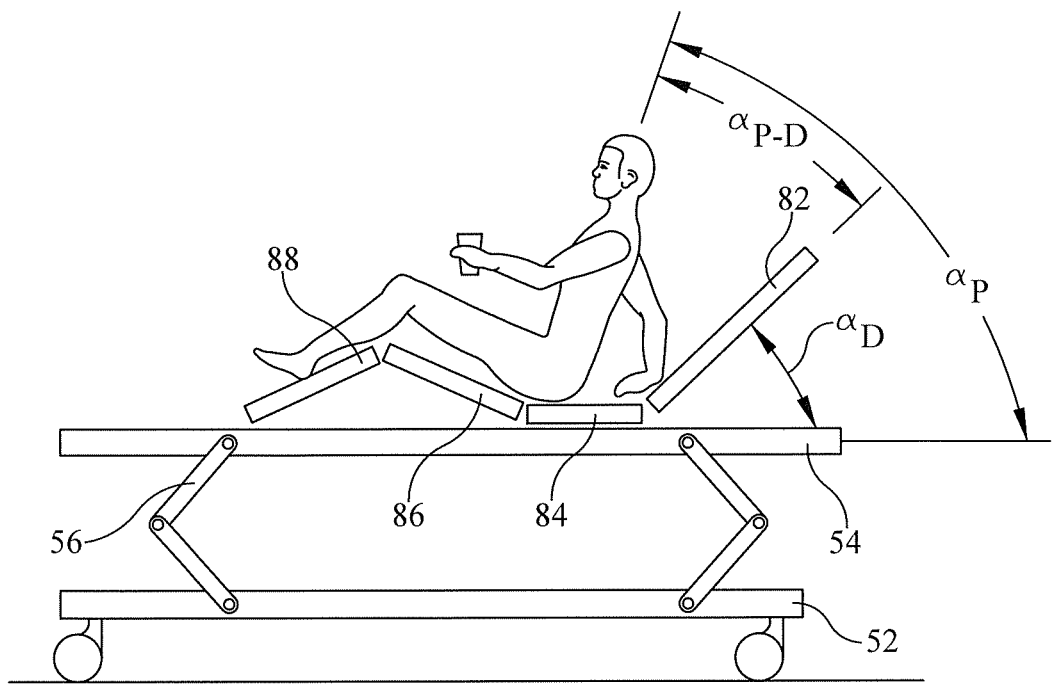

Referring to FIG. 19, the orientation of an orientation adjustable deck section, such as torso section 82, thigh section 86 and calf section 88, may be determined by comparing an image of the orientation adjustable deck section and a reference component to library records whose information content shows the relative orientation of the deck section and the reference component for various orientations of the deck section. In the example of FIG. 19 the reference component is elevatable frame 54. The library contains at least a record whose information content represents the orientation adjustable section at its maximum orientation (closest to vertical) and a record whose information content represents the orientation adjustable section at its minimum orientation, which is usually parallel to elevatable frame 54

When establishing the information content of the image it may sometimes be desirable to distinguish between the state of a bed component and the state of the occupant. For example, the orientation angle of deck torso section 82 may be of interest not for its own sake, but instead to have knowledge of the orientation angle of the occupant's torso. In other words the orientation angle of the torso section serves as a surrogate for the orientation angle of the occupant, which is the parameter of interest. FIG. 19 shows an occupant holding his torso erect in order to drink a glass of water. The occupant's torso is at an angle $\alpha_P$, which is greater than angle $\alpha_D$ of the deck torso section. Comparing the image of FIG. 19 to a library of images of the bed and its components without regard to the state of the patient will correctly identify that the torso deck section is at angle $\alpha_P$, but would not guarantee that the occupant's torso is at the same orientation, especially if the difference, $\alpha_{P-D}$ is small enough to be within the range of error of the comparison technique. Therefore, the method described in this specification includes establishing the orientation of the torso section from a visible spectrum image and establishing the angular orientation of the occupant from an auxiliary image, which may be an infrared image.

Figure 20:
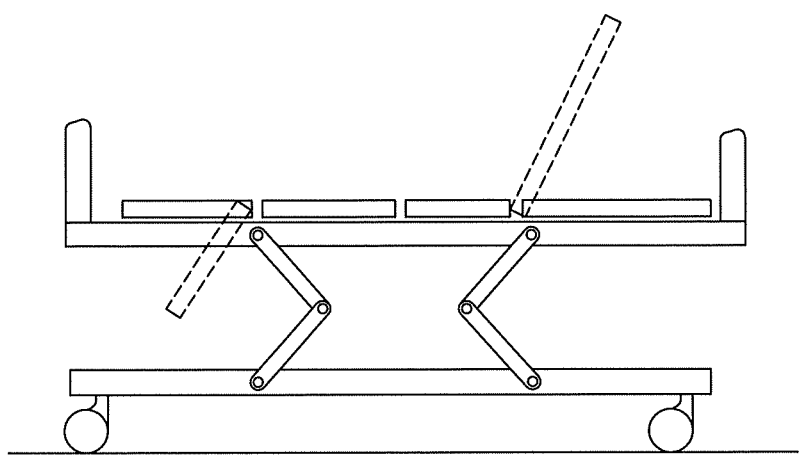

Referring to FIG. 20, some beds can be placed in both a bed configuration (solid lines) and in a chair-like configuration (dashed lines). The bed and chair like configurations are also shown in FIGS. 2-3. The chair configuration may be characterized by several parameters being concurrently in a state uniquely characteristic of the chair configuration. Examples of unique parameter values characteristic of the chair configuration include 1) the elevatable frame 54 at or near its lowest possible elevation, 2) torso section 82 at or near its maximum orientation, 3) calf deck section 88 both oriented with its footward end lower than its headward end, and at an elevation lower than that of the elevatable frame, and 4) the footboard being absent. Determining whether the bed is in a bed configuration or a chair configuration may be accomplished by comparing an image of the bed as a whole to library records whose information content represents the bed and chair configurations. Alternatively the determination may be made by assessing if individual components (frame, deck sections, footboard) are in a state which, taken together, indicate the chair configuration (e.g. frame elevation, deck section orientations).

Figure 21:
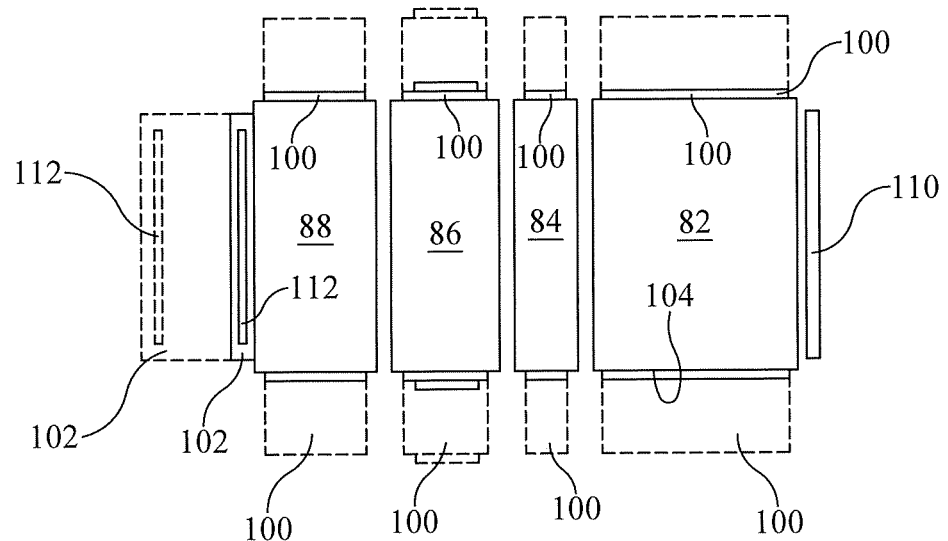
FIG. 21 is a schematic plan view of a hospital bed framework showing deck sections of the framework and a variety of deck extension panels and presented in the context of an example of how the methodology described herein can be used to determine the state of the extension panels.

FIG. 21 shows deck width adjustment panels 100 and a deck length adjustment panel 102 in both a stowed or retracted state (solid lines) and a fully deployed or fully extended state (dashed lines). The adjustment panels are also referred to as extension panels. The deployment status of the extension panels (stowed, fully extended, or partially extended) may be determined by comparing an image containing the panel and a reference component to library records whose information content represents the positional relationship between the panel and the reference component for various positions of the panel. The following discussion uses a width extension panel 100 as an example. In the example of FIG. 21 the reference component is edge 104 of a host deck section. The library contains at least a record whose information content represents the deployed state and a record whose information content represents the stowed state.

Figure 22:
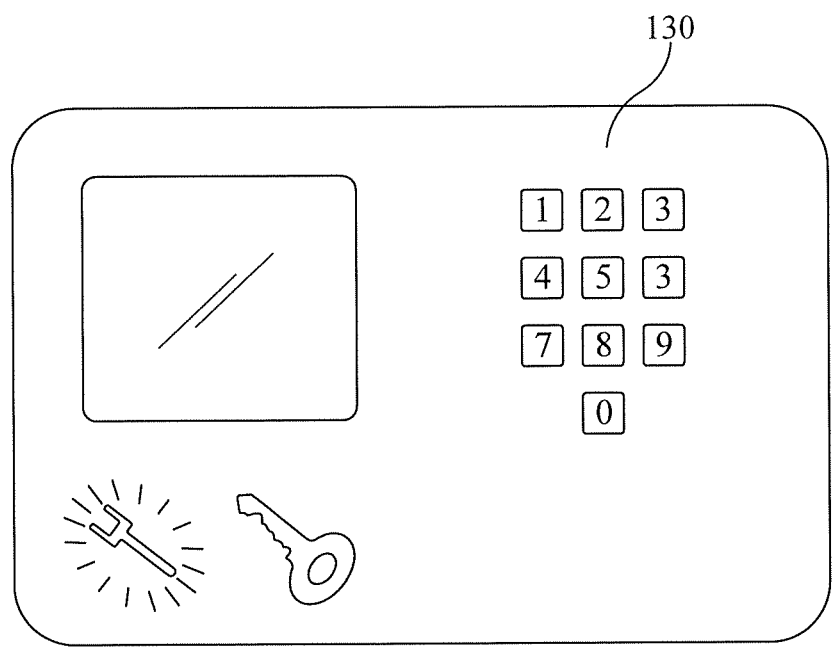
FIG. 22 is a schematic view of a hospital bed user interface having a maintenance indicator and a lockout indicator and presented in the context of an example of how the methodology described herein can be used to determine the state of the indicators.

Referring to FIG. 22, the state of various indicators may be determined by comparing an image containing the indicator of interest to library records whose information content represents the various possible states of the indicator. FIG. 22 shows a user interface having a "maintenance required" indicator light in a shape suggestive of a wrench and a lockout indicator light in a shape suggestive of a key. Each indicator has an illuminated state (the illustrated state of the maintenance indicator) and a nonilluminated state (the illustrated state of the lockout indicator). The library contains library records whose information content represents the illuminated and nonilluminated states of the maintenance indicator and the illuminated and nonilluminated states of the lockout indicator.

The foregoing paragraphs present examples of several different components which can be used to determine the state of the bed or of its systems or components. However these are examples only. The methods described herein are applicable to other bed components and systems.

In the foregoing examples, discrete states (maximum and minimum conditions) have been used in connection with the siderails, elevation adjustability of the elevatable frame, orientation adjustability of the elevatable frame, orientation adjustability of the deck sections and adjustment of extension panels. However it is typical for these bed components to be positionable at one or more intermediate states between their respective extremes. The intermediate states may be discrete states, or it may be possible to position a component anywhere between its minimum and maximum. For example the siderails of some beds may be positionable in one or more discrete, intermediate states higher than the stowed state and lower than the deployed state. Alternatively the siderails of some beds may be positionable at intermediate elevations anywhere between their deployed and stowed positions. Extension panels may be positioned anywhere between their stowed and fully extended states. The elevatable frame and the orientation adjustable deck sections may also be oriented at intermediate orientations anywhere between their minimum and maximum states of orientation.

If knowledge of intermediate states such as those described above is desired, the method may use an interpolation algorithm to determine the extent to which the value of a parameter as captured in the camera image differs from the values represented by the library records whose information content represents the extrema for that parameter. Alternatively, an additional library record can be provided for each discrete intermediate state. In another alternative, additional library records fewer in number than the number of intermediate positions can be provided, and an interpolation algorithm can be used to interpolate between the two library records whose information content most closely matches that of the image under consideration. The results of the interpolation can be considered to be a library record which is notional but nevertheless representative of the state of the device. If a component or system is continuously adjustable such that it can be in any state between a minimum and a maximum, instead of only in a limited number of discrete states, an interpolation algorithm may be used to interpolate between the closest two of two or more library records. In another variant the method does not interpolate between two records but instead accepts the closest of two records as a match. "Closest" means the record whose information content most resembles the information content of the image even though the resemblance is imperfect.

The components useful for determining status information about a system of interest need not be limited to those described in the foregoing examples. For example information about the elevation state of the elevatable frame was described as being based on a comparison of an image of the elevatable frame to records whose information content represented various elevations of the frame. However the elevation status information could instead have been determined from an image of the linkage components of the elevation system and library records which represent possible geometric states of those linkage components and which have been correlated to elevations of the elevatable frame. As with the more direct techniques, the actual state can be estimate based on interpolation or acceptance of an imperfect resemblance.

Certain states or combinations of states may reveal the need to issue a nurse call, i.e. to alert a caregiver that intervention is required. For example a determination that a previously deployed siderail had been lowered to its stowed position may indicate that an occupant who is not well enough to move about on his own is intent on exiting the bed. As a result the method may issue a nurse call in order to bring a caregiver to the bedside to render assistance.

Figure 23:
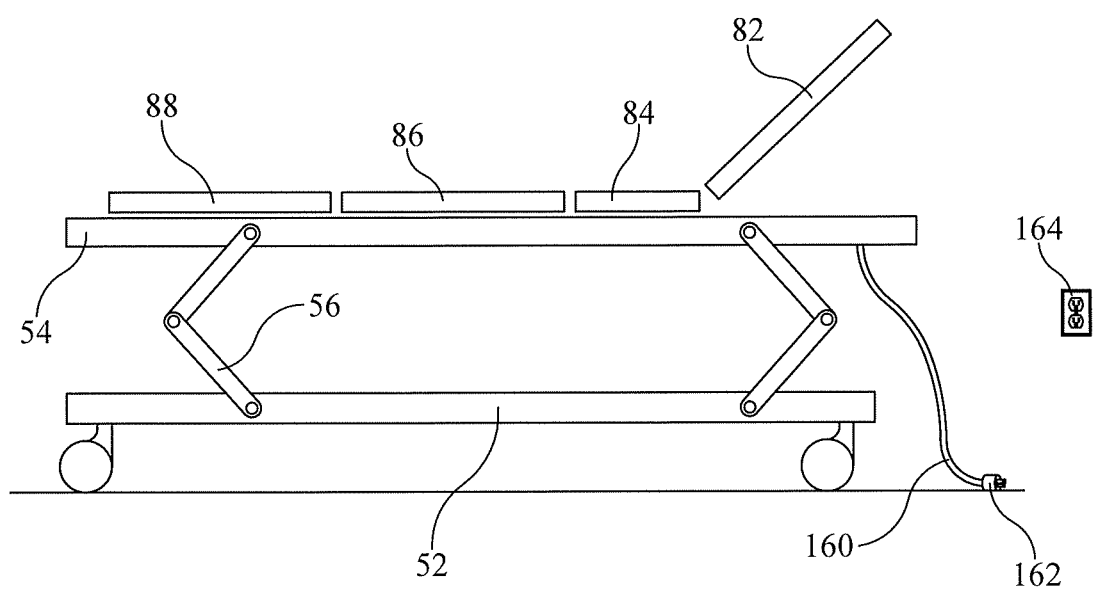
FIG. 23 is a schematic side elevation view of a hospital bed presented in the context of an example of how the methodology described herein can be used to determine a state of the bed which depends on a relationship between the bed and its surroundings.

The possible state of the bed or other device may depend on a relationship between the bed or device and its surroundings. FIG. 23 shows an example in which the status of electrical power to a hospital bed depends on whether or not a bed power cord 160 is plugged into an alternating current (AC) electrical outlet 164. Referring to the block diagram of any one of FIG. 11, 13 or 15, the step at block 250 of acquiring an image of at least a portion of the bed includes also capturing information about the surroundings of the bed. In this example the outlet is a relevant portion of the surroundings.

The image of at least a portion of the bed and the image of the relevant portion of the surroundings may be contained in a single image. Alternatively the image of the bed may be contained in a first image and the image of the relevant portion of the surroundings may be contained in a second image. Library 206 includes a record whose information content represents plug 162 of power cord 160 inserted into outlet 164. Alternatively or additionally the library includes a record whose information content represents the power cord not plugged into the outlet.

At block 254, the step of comparing the information content of the image or images to information contained in at least one record of a library includes comparing the information content of the image or images to at least one of the library records whose information content represents a relationship between the bed and the surroundings. In the present example the represented relationship is the relationship between the plug of the power cord and the electrical outlet, i.e whether or not the plug occupies the outlet. In the example of FIG. 23 the method will determine that the plug does not occupy the outlet and therefore AC electrical power is not being supplied to the bed.

The methods as described so far do not take advantage of any knowledge about the field of view of the camera. In other words every library record has been considered to be a potential candidate match for the acquired image. The method compares the information content of the acquired image to the information content of a selected library record and advances through the library records until it either identifies a match and advances to block 270, or fails to identify a match after having compared the image to all the library records. Therefore the method may involve a comparison with a substantial number of the library records, and possibly all the library records, to identify a match or determine that a match does not exist. Accordingly the method may be inefficient.

Figure 24:
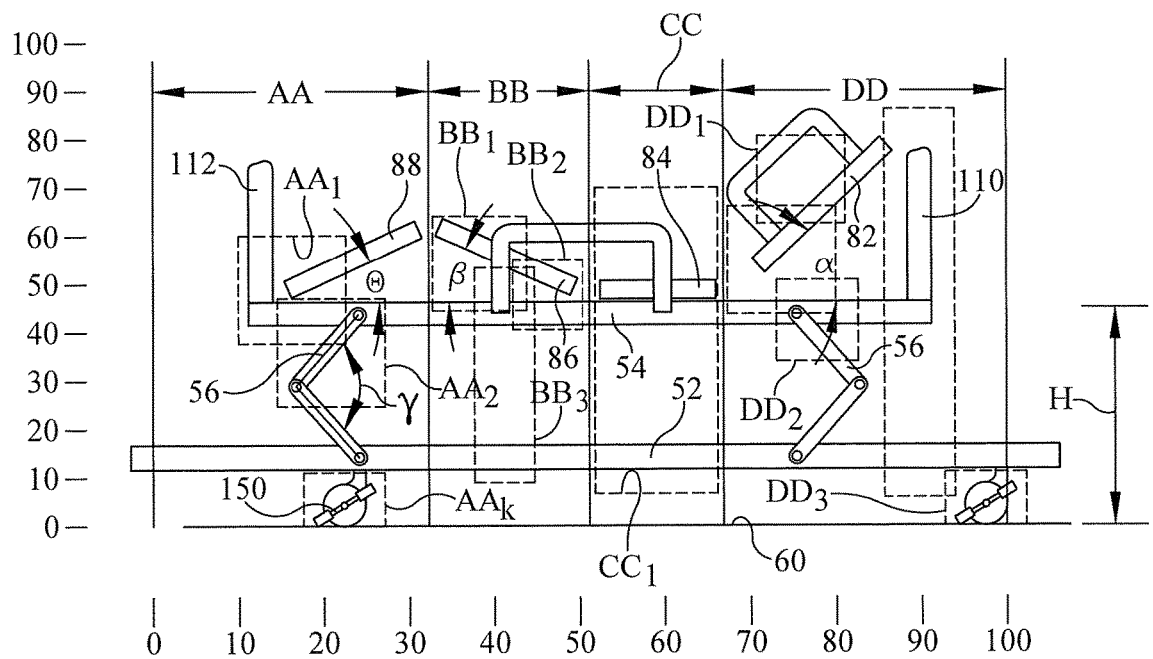
FIG. 24 is a diagram showing a bed in an arbitrary configuration and divided into sectors and subsectors such that each subsector is a field of view of an imaging device such as a camera, and also showing a library of records divided into groups and subgroups, and also showing a portion of a user interface.
Figure 24:
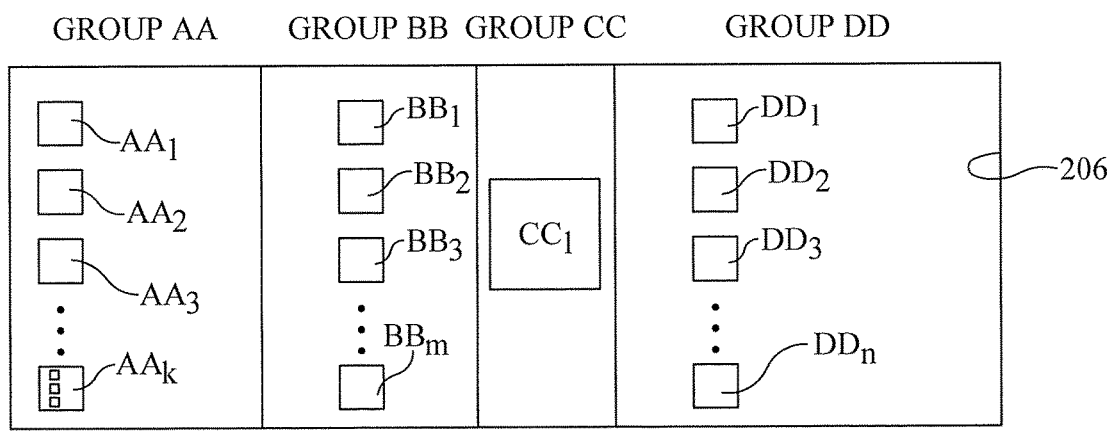
Figure 24:
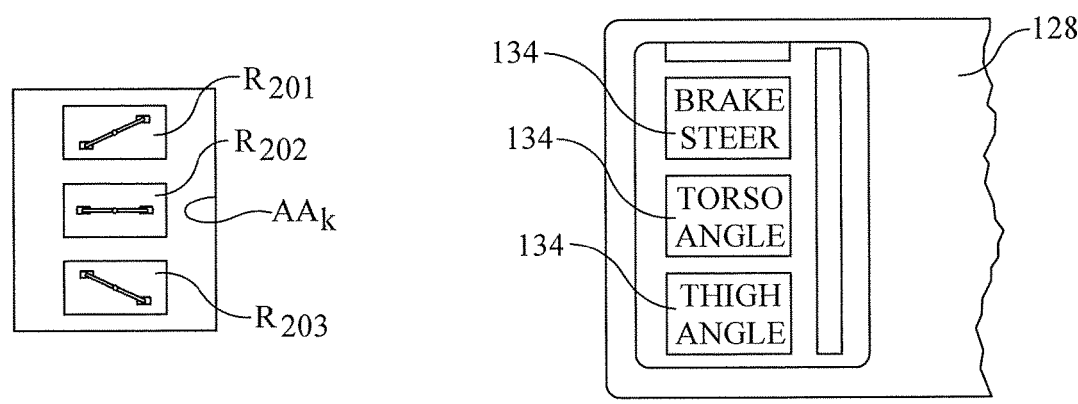

A more efficient approach compares the acquired image to only a subset of the library records. FIG. 24 shows library 206 divided into four groups AA, BB, CC, DD, each of which is subdivided into one or more subgroups such as $AA_1$ through $AA_k$. Each subgroup contains one or more records representing the possible states of visually discernible features of some portion of the bed. For example the enlargement of record subgroup $AA_k$ at the bottom of the page shows that subgroup $AA_k$ includes three records, each of which includes information content representing brake/steer pedal 150 in one of its three possible states, brake ON, steer, and transport.

FIG. 24 also includes a schematic elevation view of a bed in an arbitrary state (brake/steer pedal in the "brake ON" position, deck sections 82, 86 and 88 at angles $\alpha$, $\beta$, $\theta$, elevatable frame 54 at elevation H and so forth). In the illustration, the view of the bed has been divided into four sectors, AA, BB, CC, DD, each of which has been subdivided into one or more subsectors such as subsectors $AA_1$ through $AA_k$. The sectors are in a one to one correspondence with the library groups, and the subsectors are in a one to one correspondence with the library subgroups.

FIG. 24 also includes a fragment of a user interface 128 with a display showing three buttons 134, each corresponding to an item of information (brake/steer system status, deck torso section angle, and deck thigh section angle). A user presses the button corresponding to the information desired. A scroll bar at the right side of the display enables a user to scroll through other selections.

Figure 25:
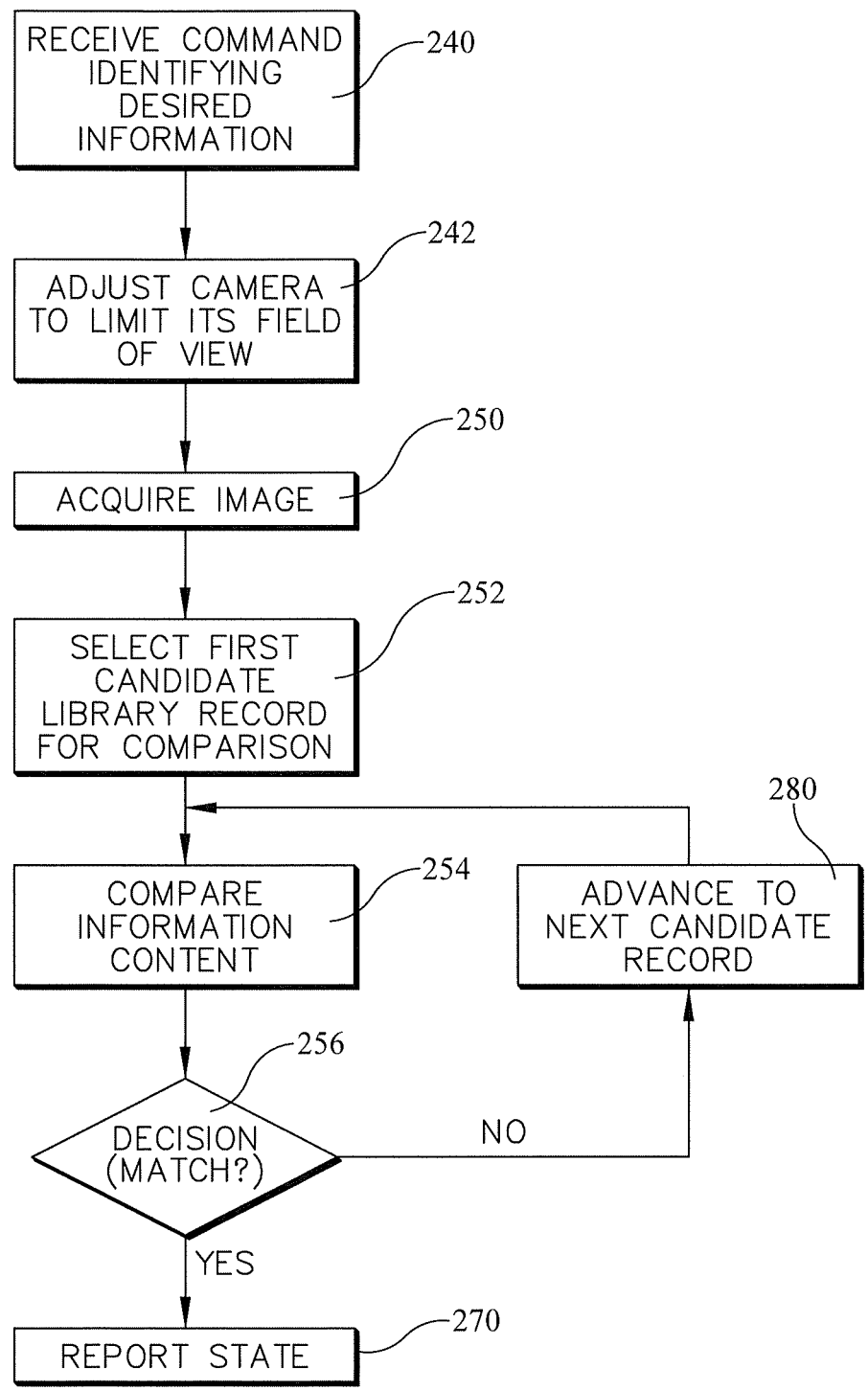
FIG. 25 is a block diagram of an embodiment of the methods described herein in which the method adjusts a camera to limit its field of view to a region of interest.

Referring additionally to FIG. 25, at block 240 the method receives a command identifying the desired information. In the illustrated example the command is issued by a user who touches one of the visible buttons 134 on user interface 128. For example a user interested in knowing the status of the brake and steer system would press the top button visible on the display. Block 240 receives the command. At block 242 the method adjusts camera 192 of FIG. 8 (e.g. changes its orientation about pitch, roll and yaw axes and zooms in or out) so that its field of view is consistent with acquiring the desired information. The field of view is a prespecified field of view correlated with the button pressed by the user, in this example the "brake/steer" button. In other words the camera points to the portion of the bed where a visually discernible feature which can reveal the status of the brake/steer system is present. In this example the feature of interest is brake/steer pedal 150, and the relevant portion of the bed is sector $AA_k$. At block 250 the method acquires an image of the selected field of view.

At block 252 the method selects a first candidate library record to compare to the information content of the image captured by the adjusted camera. A candidate record is one whose information content may yield a match with the information content of the image of the selected field of view. The candidate records are a proper subset of the entire record population of the library. (We use "proper subset" in the conventional sense that the entire population of records contains at least one record that is not in the subset.) Specifically, the candidate records are the subset of records which have been identified as having information content which may yield a match with the information content of the image. In the present example records contained in subgroups $AA_1$ through $AA_{k-1}$ and those in groups BB, CC and DD are not candidates for comparison with the image of subsector $AA_k$ because those records are known to not contain any information useful for determining the state of the brake/steer system. However the three records of record subgroup $AA_k$ qualify as candidate records.

At block 254 the method carries out the comparison of information content and proceeds to decision block 256 which is analogous to blocks 256 of FIGS. 11 13 and 15. The method then follows either the YES path to reporting block 270 or the NO path to block 280. When the method arrives at block 280 it advances to the next candidate record in the library. The method steps at blocks 254 and 256 are repeated until either a match is identified or all the candidate records have been examined.

A limiting case of the method just described occurs when the desired information involves only two possible counter-states (i.e. complementary states) such as brake ON and brake OFF and when the subset of records inspected include only those two possibilities. A conclusion that the bed is in a particular state can then be reached by comparing the information content of the image to the information contained in exactly one record of the library. If the comparison is positive for the state corresponding to the information content of the image, the bed is in the state represented by the library record. If the comparison is negative for the state corresponding to the information content of the image, then it can be concluded that the bed is in the counterstate. As already noted, depending on the ramifications of an incorrect conclusion, it may be desirable to not conclude that the bed is in a particular state based on a negative comparison alone, but to instead reach that conclusion only if a positive comparison is obtained.

FIG. 24 shows a one to one correspondence between the subgroups and the subsectors. A state of the bed which is determinable from an image of a given subsector can be determined by comparing the image to the records contained in only the corresponding library subgroup; comparison against the records of any other subgroup is not required because the library is intentionally organized in a way that the information content of those records will not yield a match. Indeed, carrying out comparisons of the image to records not contained in the corresponding record subgroup will degrade the efficiency of the method. However a one to one correspondence between subgroups and subsectors is not necessary. For example if the records of subgroups $AA_1$ and $AA_2$ were combined into a larger subgroup $AA_{1+2}$, an effort to determine a bed state related to linkage angles $\sigma_H$, $\sigma_F$ could involve comparison of the acquired image to library records which are destined to not yield a match.

FIG. 24 shows the library and view of the bed organized in a two layer hierarchy, groups and subgroups for the library, and sectors and subsectors for the view of the bed. However a single layer organization or a hierarchical arrangement of more than two layers can be used instead if desired.

The example used in connection with FIG. 24 shows that the records contained in subgroup $AA_K$ are limited to records useful to determine the state of one and only one bed component (the state of the brake/steer system as indicated by the position of the brake/steer pedal). (Alternatively this may be thought of as one and only one aspect of the state of the bed as a whole). However the records contained in a subgroup need not be limited to those useful for only a single component state/aspect. In the interest of efficiency it is simply advisable to limit the comparison of an image to the records contained in groups whose records are most likely to yield a match, and to forego comparison of the image to records contained in groups whose records are not likely to yield a match.

The description of the method in connection with FIG. 24 is based on the field of view of the camera having been limited to certain prespecified sectors of the bed. In other words a user employs button 134 of user interface 128 to request information about the state of a particular component. That request results in a command for a camera actuation system to change the orientation of the camera and to zoom in or out to capture a field of view which has been previously correlated to a command button 134, and therefore to the user's request.

In an alternate embodiment the orientation and zoom of the camera can be a non-prespecified orientation and zoom established by a user in real time, for example by using a joystick. In that case sensors associated with the camera provide feedback about its orientation and field of view. That feedback is processed by processor 202 to identify, based on the sensor data, which library records are worthwhile candidates for comparison to the acquired image.

Figure 26:
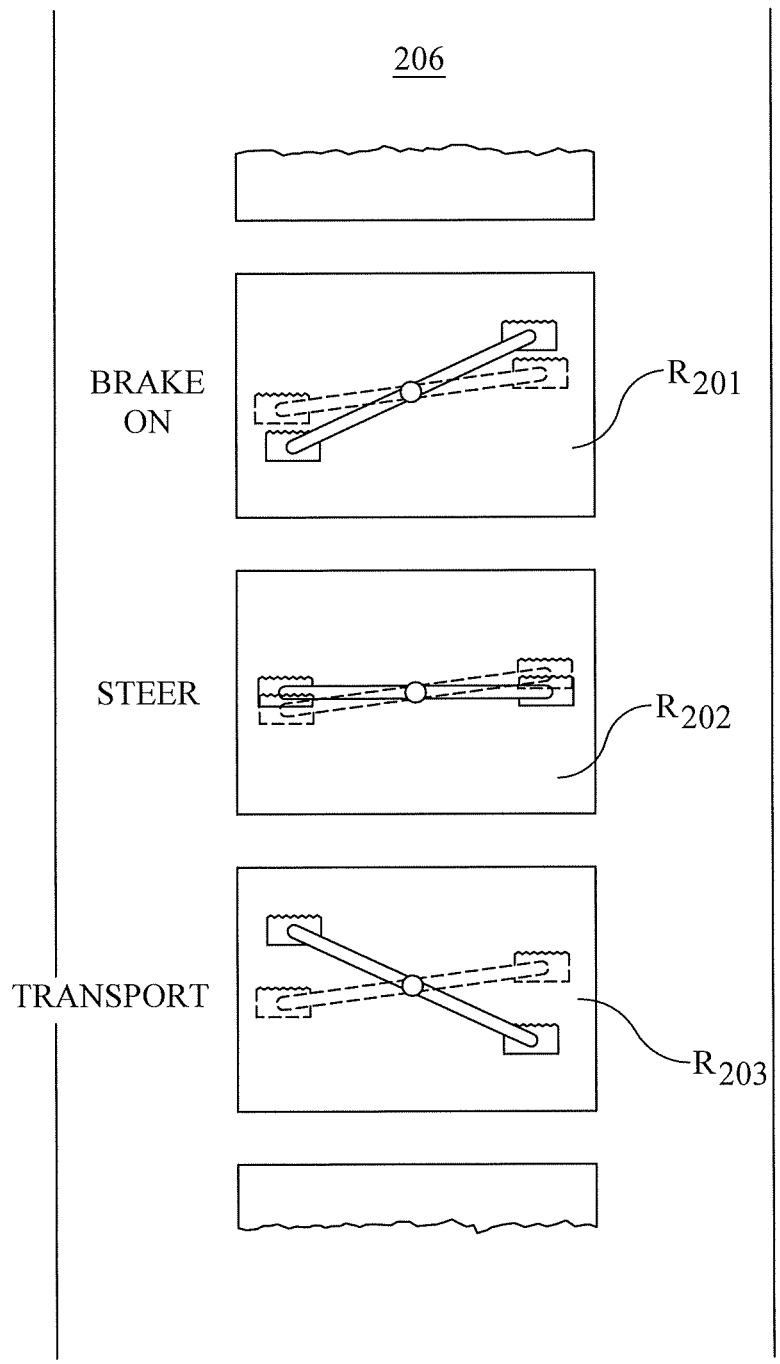
FIG. 26 is a view similar to FIG. 14 in which an acquired image of the actual brake position (dashed lines) has been superimposed on each of the library members in order to illustrate an embodiment of the methodology described herein which accounts for the possibility that the information content of the acquired image may not always yield an unquestionable match with the information content of the library members to which it is compared.

Another embodiment of the method accounts for the possibility that the information content of the acquired image may not always yield an unquestionable match with the information content of the library records to which it is compared. For example, FIG. 26 shows the library records for brake ON, steer, and transport states as indicated by the brake/steer pedal (solid lines) with an acquired image of the actual position of the brake/steer pedal (dashed lines) superimposed thereon. The comparison of the image with record $R_{201}$ is suggestive but not dispositive that the brake/steer system is in the "brake ON" state. The comparison of the image with record $R_{202}$ is highly suggestive that the system is in the "steer" state. The comparison of the image with record $R_{203}$ strongly suggests that the system is not in the "transport" state.

Figure 27:
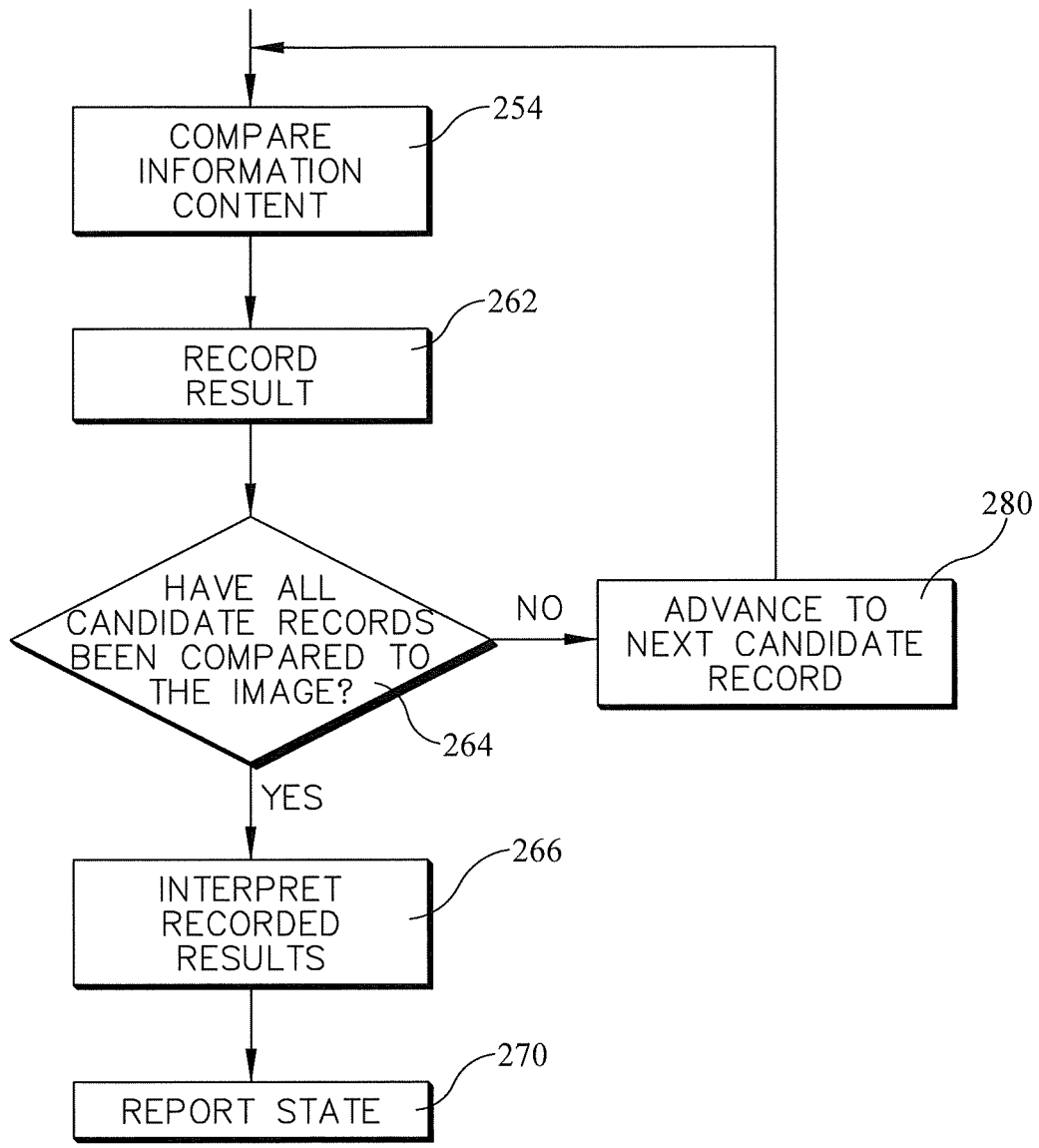
FIG. 27 is a block diagram of the embodiment referred to in the description of FIG. 26.

The embodiment of the method shown in FIG. 27 allows for a conclusion that a match has been identified even though the comparisons of FIG. 26 involve some ambiguity.

The diagram of FIG. 27 begins with block 254 which corresponds to the method step of comparing the information content of the acquired image to the information content of a candidate library record, for example to the information content of record $R_{201}$ of FIG. 26. At block 262 the method records the result of the comparison. Using the example of FIG. 26 the recorded result may be the amount by which the angular orientation of the brake pedal in the image differs from the orientation of the pedal as represented by the information content of the record being examined.

At block 264 the method determines if the information content of the image has been compared to the information content of all candidate records. If not, the method follows the NO branch to block 280, advances to the next candidate record, and repeats the comparison step at block 254.

Once the image has been compared to all candidate records, the method follows the YES branch from block 264 to block 266 where the method interprets the recorded results to determine whether or not the recorded results yield a positive comparison. For example the interpretive step may follow an algorithm which recognizes from record $R_{201}$ a 20% probability that the brake/steer system is in the "brake ON" state, recognizes from record $R_{202}$ an 80% probability that the brake/steer system is in the "steer" state, and recognizes from record $R_{203}$ a 0% probability that the brake/steer system is in the "transport" state (the percentages need not add up to 100%). Therefore, the algorithm causes the report at block 270 to be that the brake/steer system is in the "steer" state.

The method as seen in FIG. 27 can also be applied even if a comparison carried out at block 254 is positive for a state represented by a library record. Carrying out the comparison of the acquired image to other candidate library records can help to validate a positive comparison or call it into question.

Figure 28:
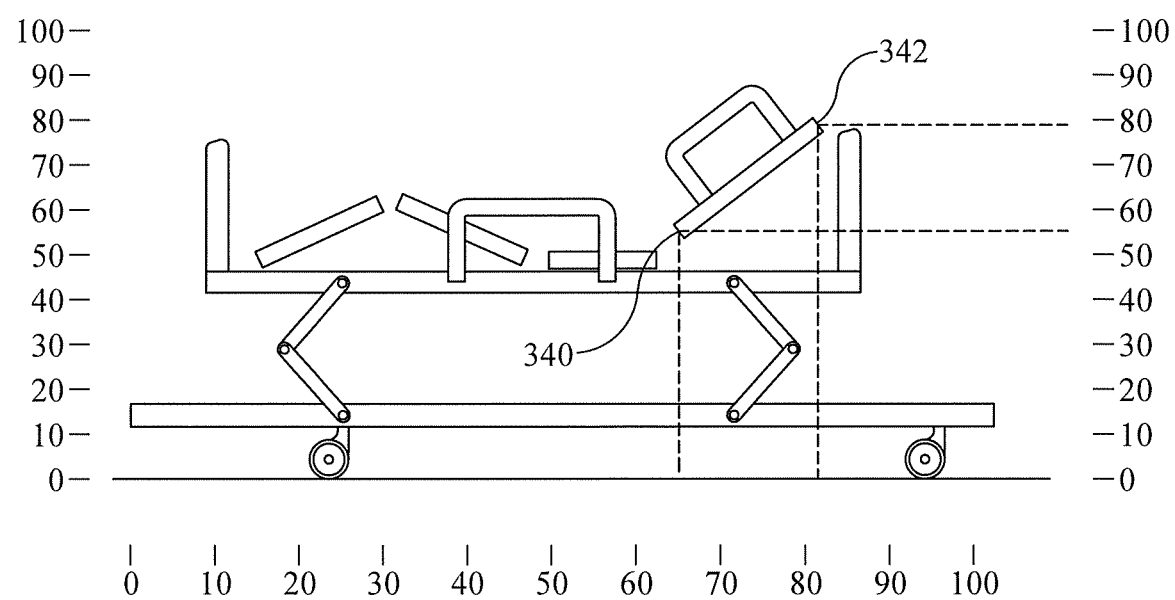
FIG. 28 is a side elevation view of a bed and a notional coordinate system superimposed thereon to illustrate an embodiment in which determining the state of the bed is depends on calculations based on the acquired image rather than by comparison of the information content of the image to the information content of one or more library members.
Figure 29:
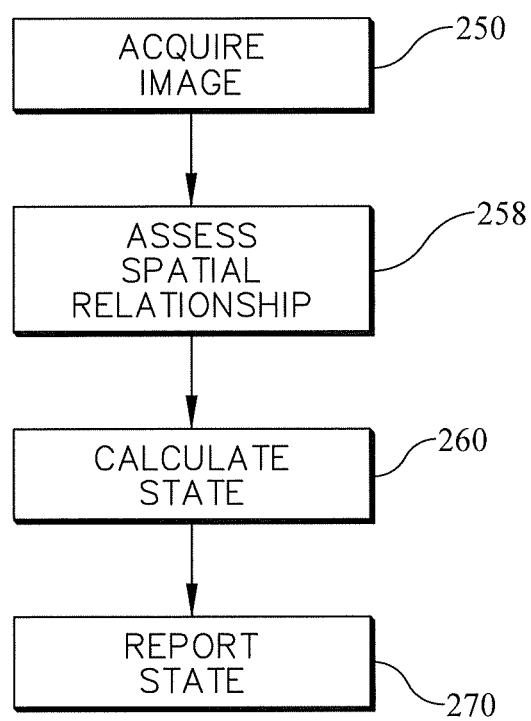
FIG. 29 is a block diagram of the calculation based method referred to in the description of FIG. 28.

FIGS. 28-29 illustrate an embodiment in which a state of the bed is determined from calculations based on the acquired image rather than by comparing the information content of the image to the information content of one or more library members. FIG. 28 shows a coordinate system extending horizontally from zero to 100 and vertically from zero to 100 gridwork. The coordinate system is for explanatory purposes; it need not be actually present on the image in order for an algorithm to carry out the calculations.

In one example the desired state of the bed is the elevation of elevatable frame 54. The method determines that the vertical coordinate of the elevatable frame is 46 units and the vertical coordinate of the floor is zero units. A calibration of the coordinate system to actual dimensions e.g. one coordinate unit equals 2 cm, reveals that the elevatable frame is about 92 cm or about 36.2 inches above the floor. Alternatively the coordinate system may reflect actual dimensions directly rather than by way of a calibration.

In another example the desired state of the bed is the orientation of deck torso section 82. The method evaluates the spatial locations of corners 340 and 342 of the torso section and determines that:

$$\alpha = \tan^{-1} \frac{(78-57)}{(82-65)} = 51 \text{ degrees}.$$

FIG. 29 shows the calculation based embodiment in general terms. At block 250 the method acquires an image of the bed or a portion thereof. At block 258 the method assesses a spatial relationship of bed components based on the information content of the image. One example of an assessed spatial relationship is the elevation of the elevatable frame relative to the floor as in the first of the two immediately preceding examples. Another example of an assessed spatial relationship is the spatial relationship between the corners of the torso section of the deck as in the second of the two immediately preceding examples.

At block 260 the method calculates the state of the bed using the results of the assessed spatial relationship or relationships. At block 270 the method reports the state as determined from the calculation.

We claim:

1. A method of determining information about a device, the method comprising:
  acquiring an image of at least a portion of the device, the image having an information content;
  comparing the information content of the image to the information content of at least one record of a library, the information content of any given record of the library representing a possible state of the device;
  if the comparison is positive, reporting that the device is in the possible state represented by the library record; and
  interpolating between library records whose information content most closely matches that of the acquired image and wherein the step of reporting reports that the device is in the possible state represented by the interpolation.

2. The method of claim 1 wherein if the comparison is negative for a complement $S_1$ of a possible state $S_2$, reporting that the device in the possible state $S_2$.

3. The method of claim 1 wherein if the comparison is negative for all but a remaining one of multiple states which are in a counterstate relationship with each other, reporting that the device is in the remaining one state.

4. The method of 1 wherein the device is a bed and the possible states represented by the library records include at least one of:
status of a brake control;
status of a brake/steer control;
elevation state of a siderail;
deployed or stowed state of a siderail;
elevation state of an elevatable frame;
orientation state of an elevatable frame;
orientation state of an orientation adjustable deck section;
chair status;
extension panel deployment status;
maintenance needed status;
lockout status; and
nurse call requirement.

5. The method of claim 1 wherein:
the step of acquiring an image of at least a portion of the device includes capturing information about the surroundings of the device, the captured information being contained in either of:
  A) the image of at least a portion of the device; and
  B) an image other than the image of at least a portion of the device; and
the comparing step includes comparing the information content of the image or images to a library record whose information content reveals a relationship between the device and the surroundings.

6. The method of claim 5 wherein the step which includes capturing information about the surroundings includes capturing an image of an electrical outlet, and the library record whose information content reveals a relationship between the device and the surroundings is one of:
  A) a library record whose information content represents a power cord of the device plugged into the outlet; and
  B) a library record whose information content represents a power cord of the device not plugged into the outlet.

7. The method of claim 1 wherein the information content of the image is compared to the information content of exactly one record of the library.

8. The method of claim 1 wherein the information content of the acquired image is compared to the information content of a set of records which is a proper subset of the records of the library.

9. The method of claim 1 including a step of determining whether or not the device is present, and carrying out the acquiring step only if the device is present.

10. The method of claim 1 including a step of determining a model of the device.

11. The method of claim 10 wherein the at least one record of the library to which the information content of the image is compared is a record specific to the model.

12. The method of claim 1 wherein the device is a bed and the step of establishing the information content of the image includes distinguishing between an orientation adjustable section of the bed and an occupant of the bed.

13. The method of claim 12 wherein the angular orientation of the orientation adjustable section of the bed is established from a visible spectrum image and angular orientation of the occupant is established from an infrared spectrum image.

14. The method of claim 1 comprising:
a) recording the result of comparing the information content of the image to the information content of a first candidate library record;
b) repeating the comparing and recording steps for one or more additional candidate library records until the acquired image has been compared to all candidate library members; and
c) determining if the comparison is positive by interpreting the recorded results.

15. A method of determining information about a device, the method comprising:
acquiring an image of at least a portion of the device, the image having an information content;
comparing the information content of the image to the information content of at least one record of a library, the information content of any given record of the library representing a possible state of the device;
if the comparison is positive, reporting that the device is in the possible state represented by the library record; and
accepting the closest of one of two records as a positive comparison for the state of the device in the acquired image, wherein the closest of the two records is the record whose information content most resembles the information content of the image, and wherein the step of reporting reports that the device is in the possible state represented by that closest record.

16. A method of determining information about a device, the method comprising:
acquiring an image of at least a portion of the device, the image having an information content;
assessing a spatial relationship or relationships from the information content of the acquired image;
calculating the state of the device using the assessed spatial relationship or relationships;
accepting the closest of one of two records as a positive comparison for the state of the device in the acquired image, wherein the closest of the two records is the record whose information content most resembles the information content of the image; and
reporting that the device is in the possible state represented by that closest record.

17. A system for determining the state of a device, the system comprising:
an imaging device;
a processor;
instructions which are executable by the processor such that the system: a) acquires an image of the device, the image having information content; and b) determines the state of the device from the information content based on interpolating between a library of records whose information content most closely matches that of the acquired image.

18. The system of claim 17 wherein the system determines the state of the device by comparing the information content of the acquired image to information representing one or more possible states of the device and, if the comparison is positive for one of the one or more states, determining that the device is in the possible state represented by the positive comparison.

19. The system of claim 18 wherein the information representing the one or more possible states of the device is contained in the library of records.

20. The system of claim 18 wherein the system determines the state of the device by A) assessing a spatial relationship from the information content of the acquired image and B) calculating the state of the device using the assessed spatial relationship.

* * * * *

UNITED STATES PATENT AND TRADEMARK OFFICE
CERTIFICATE OF CORRECTION

PATENT NO. : 10,973,720 B2
APPLICATION NO. : 15/668226
DATED : April 13, 2021
INVENTOR(S) : Eric D. Benz et al.

Page 1 of 1

It is certified that error appears in the above-identified patent and that said Letters Patent is hereby corrected as shown below:

On the Title Page

References Cited, under the heading OTHER PUBLICATIONS, delete the word "Kinnect" in the first other publication listed and replace it with --Kinect--.

In the Claims

In Claim 4, Column 19, Line 1, delete "of 1" and insert in its place --of claim 1--.

Signed and Sealed this
Fifteenth Day of June, 2021

Drew Hirshfeld
*Performing the Functions and Duties of the*
*Under Secretary of Commerce for Intellectual Property and*
*Director of the United States Patent and Trademark Office*